United States Patent [19]
Kokubo et al.

[11] Patent Number: 5,956,688
[45] Date of Patent: Sep. 21, 1999

[54] ELECTRONIC TRANSACTION APPARATUS AND COMPUTER READABLE STORAGE MEDIUM ON WHICH IS RECORDED CONTROL PROGRAM FOR EXECUTING FORMAT CONVERSION IN ELECTRONIC TRANSACTION

[75] Inventors: Yoshiyuki Kokubo; Takashi Iwamoto; Tutomu Fujita, all of Kawasaki, Japan

[73] Assignee: Fujitsu Limited, Kawasaki, Japan

[21] Appl. No.: 08/987,839

[22] Filed: Dec. 9, 1997

[30] Foreign Application Priority Data

May 8, 1997 [JP] Japan .................................. 9-117788

[51] Int. Cl.⁶ .................................................. G06F 17/60
[52] U.S. Cl. ................................. 705/1; 705/35; 705/37; 705/26; 345/340; 345/346; 395/500; 395/680; 709/204; 709/206; 709/207
[58] Field of Search ................................... 705/1, 26, 35, 705/37, 10; 395/701–710, 680, 500, 200.34, 200.36, 200.37, 671; 709/101, 204, 206, 207; 345/326, 340, 342, 356

[56] References Cited

U.S. PATENT DOCUMENTS

| | | | |
|---|---|---|---|
| 4,951,196 | 8/1990 | Jackson | 705/37 |
| 5,202,977 | 4/1993 | Pasetes, Jr. et al. | 395/500 |
| 5,557,780 | 9/1996 | Edwards et al. | 395/500 |
| 5,694,551 | 12/1997 | Doyle et al. | 705/26 |
| 5,758,126 | 5/1998 | Daniel et al. | 395/500 |
| 5,794,206 | 8/1998 | Wilkinson et al. | 705/1 |
| 5,878,419 | 3/1999 | Carter | 707/10 |

*Primary Examiner*—Edward R. Cosimano
*Assistant Examiner*—Raquel Alvarez
*Attorney, Agent, or Firm*—Staas & Halsey

[57] ABSTRACT

A relevance information setting unit imparts the same relevance code to related elements in a standard message to indicate a relevance. A mapping processing unit displays a standard message and a local message side by side on a display and while referring to the relevance codes imparted to the standard elements, defines link relations with local elements on the display to create a conversion table for use in a message format conversion in a conversion unit. A link line appears when a standard element and a local element are selected to be linked.

14 Claims, 30 Drawing Sheets

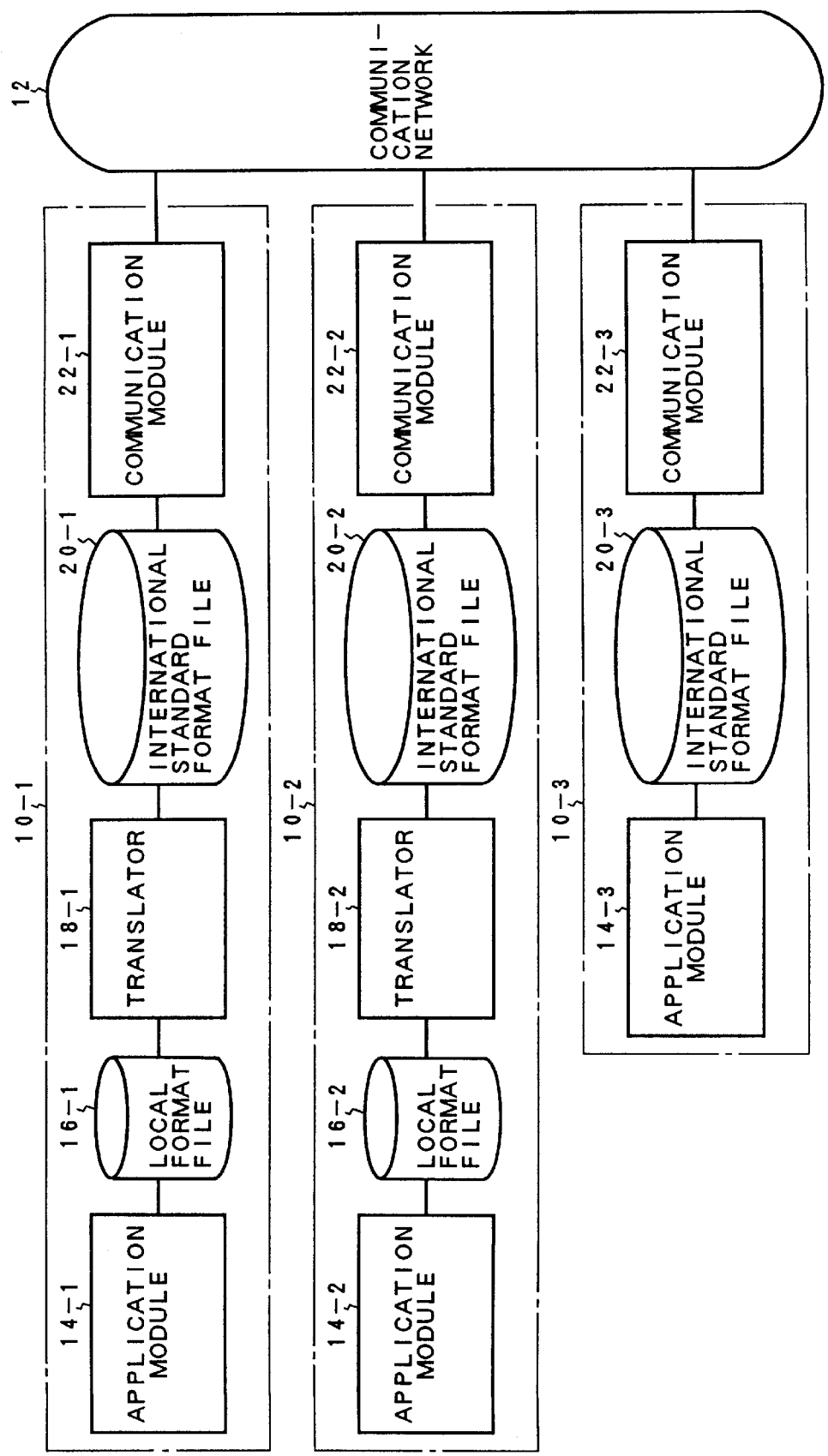

FIG. 4

| SEGMENT/ELEMENT 74 | RELEVANCE 75 | MANDATORY | ATTRIBUTE | MAXIMUM | MINIMUM | REPEAT COUNT |
|---|---|---|---|---|---|---|
| SEGMENT TAG | | | | | | |
| ELEMENT TAG — 62 | 01 | M | AN | 6 | 0 | 1 |
| ELEMENT TAG | | M | N | 4 | 0 | 1 |
| ELEMENT TAG | | M | N | 3 | 0 | 1 |
| ELEMENT TAG | | M | A | 2 | 0 | 1 |
| ELEMENT TAG | 01 | C | A | 2 | 0 | 1 |
| ELEMENT TAG | | C | AN | 4 | 0 | 1 |
| ELEMENT TAG | | C | AN | 1 | 0 | 1 |

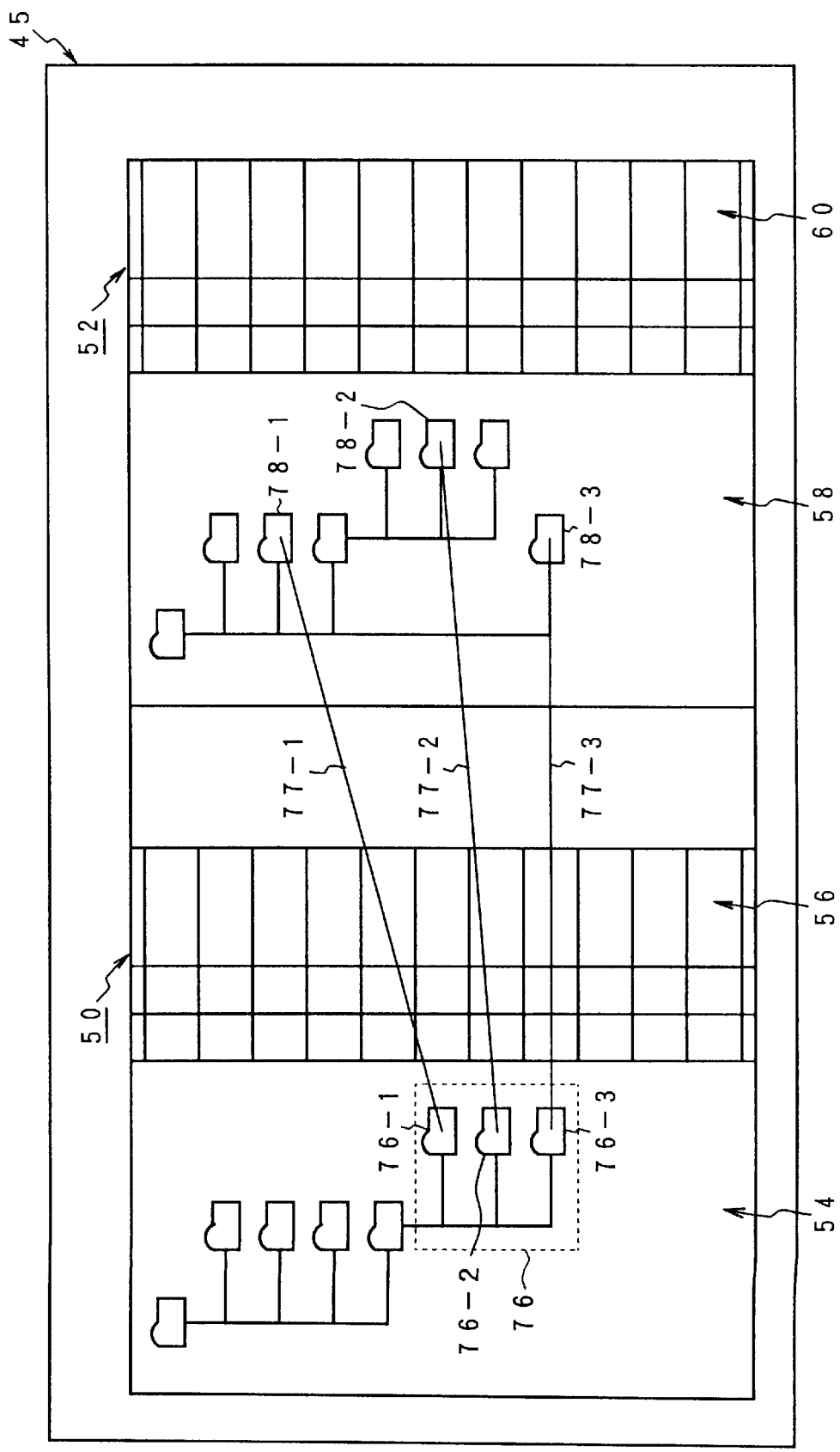

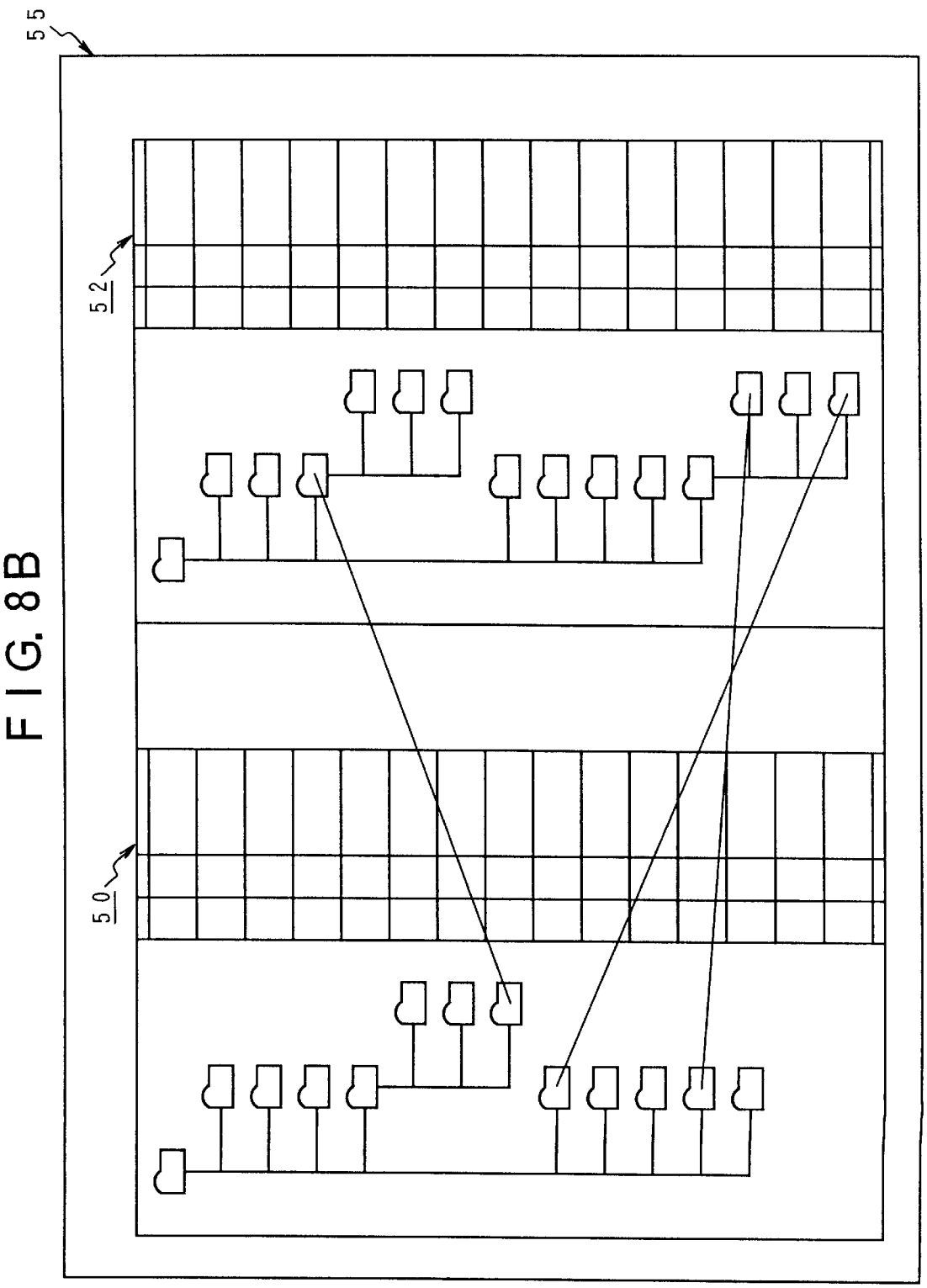

FIG. 9

| SEGMENT/ELEMENT 50 | RELEVANCE 75 | | SEQUENCE 52 |
|---|---|---|---|
| SEGMENT GROUP 1 | 01 | | SEQUENCE GROUP 1 |
| SEGMENT GROUP 2 | 01 | | SEQUENCE GROUP 2 |
| SEGMENT GROUP 3 | | | SEQUENCE GROUP 3 |
| SEGMENT GROUP 4 | | 77-4 / 77-5 | SEQUENCE GROUP 4 |
| ..... | | | ..... |
| SEGMENT GROUP N 54 | 01 56 | | SEQUENCE GROUP N 58 |

74

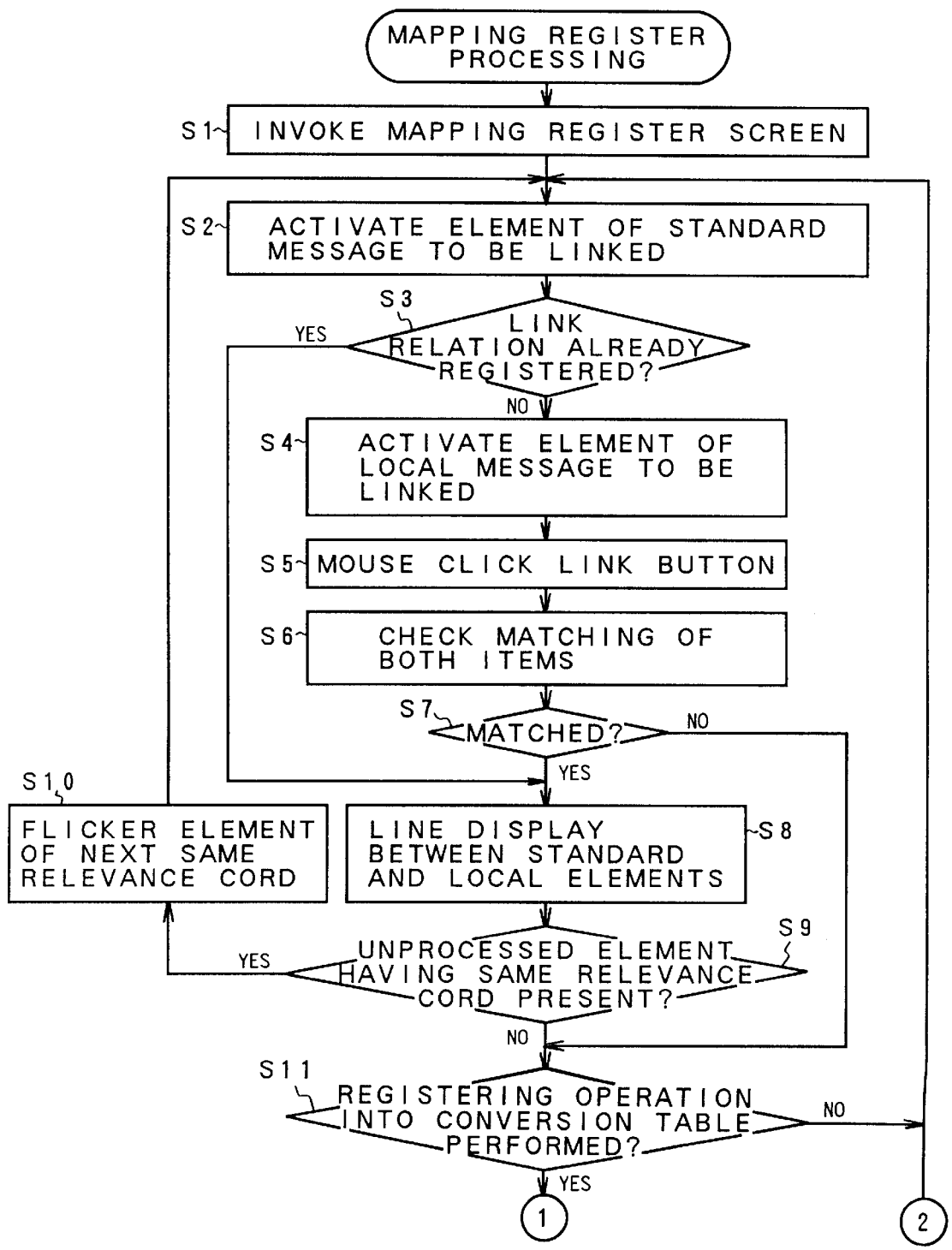

F I G. 1 1
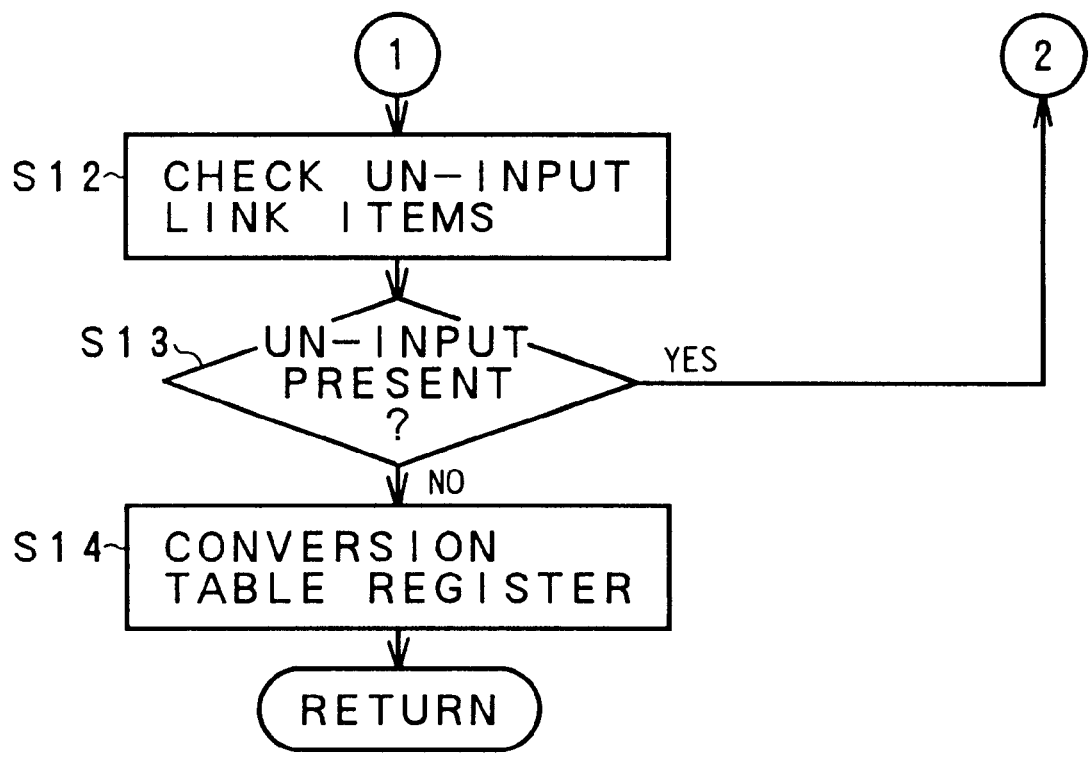

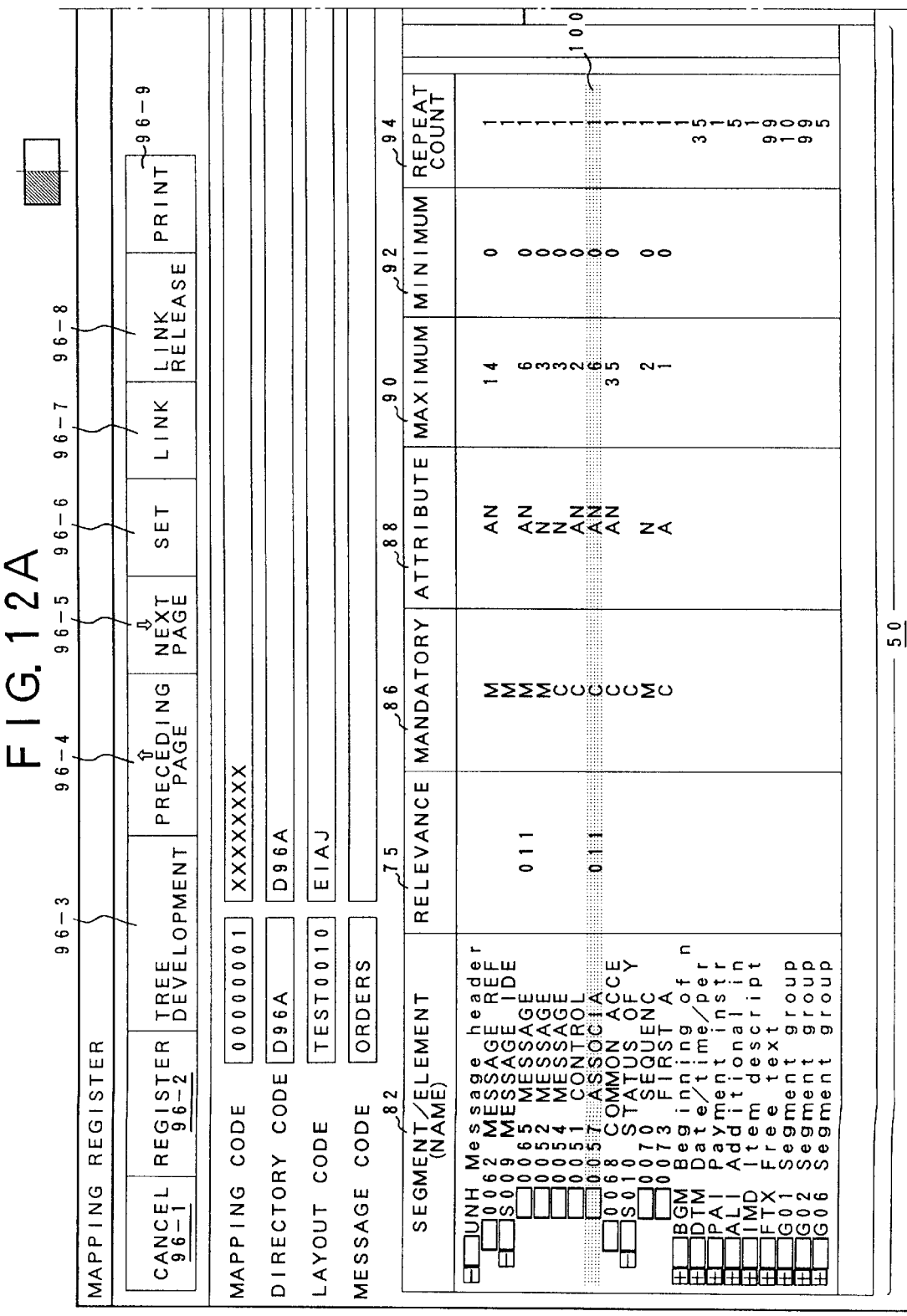

| CLASSIFI-CATION | MESSAGE TAG | DEFINITION OF MESSAGE CODE FUNCTION |
|---|---|---|
| ORDER RECEIVING /ISSUING RELATION | INVOIC (Commercial Invoice) | MESSAGE FOR DEMANDING PAYMENT FOR ARTICLES OR SERVICES SUPPLIED UNDER TERMS AGREED BETWEEN SELLER AND BUYER. (R.527/Rev.1) UN STANDARD INVOICE MESSAGE FUNCTIONS ALSO AS SPECIFICATIONS FOR Debit Note MESSAGE AND Credit Note MESSAGE BY PROVIDING WITH PROPER DATA. "INVOICE" IN UNSMs DOCUMENT (R.527) IS CONSTRUED TO HAVE EXTENSIVE MEANING OF "Invoice/Credit Note/Debit Note". |
| | ORDERS (Purchase Order) | MESSAGE SPECIFYING DETAILS ABOUT ARTICLES AND SERVICES ORDERED UNDER TERMS AGREED BETWEEN SELLER AND BUYER. (R.586&Corr.1) |
| | ORDCHG (Purchase Order Change) | MESSAGE FROM BUYER FOR TRANSMITTING TO SELLER THE CONTENT OF BUYER'S PURCHASE ORDER CHANGE REQUEST IN DETAIL. (R.741) |
| | ORDRSP (Purchase Order Response) | MESSAGE FROM SELLER TO BUYER, WHICH ANSWERS Purchase Order MESSAGE OR Perchase Order Change REQUEST MESSAGE. (R.741) |
| | PARTIN (Party Information) | MESSAGE ENABLING TRANSMISSION OF FUNDAMENTAL INFORMATION ABOUT DATA UPON LOCATION, RELATED USE, MANAGEMENT, FINANCIAL AFFAIRS, MANUFACTURE AND TRANSACTION. (R.741) |
| | PRICAT (Price/Sales Catalogue) | MESSAGE ENABLING TRANSMISSION OF INFORMATION ABOUT PRICES OF ARTICLES OR SERVICES AND SPECIFICATION OF CATALOGS, SUPPLIED FROM SELLER TO BUYER. (R.741) |

FIG. 16

| CLASSIFICATION | MESSAGE TAG | DEFINITION OF MESSAGE CODE FUNCTION |
|---|---|---|
| ORDER RECEIVING /ISSUING RELATIONSHIP | QALITY (Quality Data) | MESSAGE FOR TRANSMITTING RESULTS OF TESTS PERFORMED TO SATISFY REQUIREMENTS OF SPECIFIED PRODUCTS OR PROCESSING, THE CONTENT OF WHICH INCLUDES THE FOLLOWINGS, BUT IS NOT LIMITED TO THOSE: TEST DATA AND MEASUREMENT CAPACITY, etc., STATISTICAL INFORMATION, TEST METHOD USED. (R.583) |
| | QUOTES (Quotation) | MESSAGE IMPARTING TO SELLER THE ABILITY TO PRESENT PRICES, DELIVERY SCHEDULE AND OTHER TERMS FOR SELLING ARTICLES OR SERVICES. (R.741) |
| | REQOTE (Request for Quote) | MESSAGE IMPARTING TO BUYER THE ABILITY TO REQUEST THE PRESENTATION OF PRICES, DELIVERY SCHEDULES AND OTHER TERMS OF SELLER OF ARTICLES OR SERVICES. (R.741) |
| | SLSRPT (Sales Data Report) | MESSAGE ENABLING TRANSMISSION OF SALES DATA ABOUT PRODUCES OR SERVICES, SUCH AS LOCATION CONCERNED, PERIOD, PRODUCT CHECK, PRICES, AMOUNT OF MONEY, QUANTITY, INFORMATION ON VARIOUS MARKETING FIELDS, AND BUYING AND SELLING PARTIES CONCERNED, THE MESSAGE ALLOWING RECEIVER TO AUTOMATICALLY PROCESS INFORMATION AND TO USE IT FOR THE PURPOSE OF PRODUCTS, PLANNING, MARKETING, STATISTICS, etc. (R.742) |
| | STATAC (Statement of Account) | MESSAGE FROM SELLER OR THE AGENT TO BUYER OF THE AGENT, PRESENTING INFORMATION ABOUT ACCOUNTING STATUS AT A SPECIFIC POINT OF TIME, THE MESSAGE BEING USED IN AID OF MEDIATION/COMPROMISE AND SERVING ALSO AS LETTER ASKING FOR PAYMENT OF ACCOUNT. (R.741) |
| | ORDINQ (Order Status Enquiry) ORDSTA (Order Status) PRDSPE (Product Specification) | |

FIG.17

| CLASSIFI-CATION | MESSAGE TAG | DEFINITION OF MESSAGE CODE FUNCTION |
|---|---|---|
| ARTICLES /MANAGEMENT | DELFOR (Delivery Schedule) | (R.711) MESSAGE IMPARTING FROM BUYER TO SUPPLIER THE INFORMATION ABOUT DETAILS OF BOTH SHORT-TERM DELIVERY INSTRUCTION IN ACCORDANCE WITH TERMS INSTRUCTED IN CONTRACT OR ORDER SHEET AND MIDIUM OR LONG-TERM REQUIREMENTS ABOUT PRODUCTS FOR PLANNED PURPOSES, THE MESSAGE BEING USED ALSO AS APPROVAL OF REFERRING HUMAN AND MATERIAL RESOURCES. |
| | DELJIT (Just-in-time Delivery) | (R.712) MESSAGE TRANSMITTING TO CLIENT CORRECT DELIVERY SEQUENCE AND REQUIREMENTS OF JUST-IN-TIME SCHEDULES FOR THE SUPPLIER, THE MESSAGE SERVING TO SUPPLEMENT STANDARD MESSAGE DELFOR (ABOVE DESCRIBED). |
| | DESADV (Despatch Advice) | (R.713) MESSAGE INFORMING OF DETAILS OF ARTICLES, WHICH HAVE BEEN DISPATCHED OR ARE READY FOR DISPATCH UNDER AGREED TERMS. |
| | INVRPT (Inventory Report) | (R.773) MESSAGE DETAILING INFORMATION RELATING TO INVENTORY, THE MESSAGE BEING USED BY BOTH PARTIES CONCERNED OF TRANSACTION. |
| | DISRPT (Distribution Report) | |

| DIRECTORY | MESSAGE TAG | SEQ | NAME | SEGMENT | SEGMENT CODE NAME | LEVEL | MANDATORY | REPEAT COUNT |
|---|---|---|---|---|---|---|---|---|
| D93A | DESADV | 00001 | Despatch Advice Message | UNH | Message header | 01 | M | 0000000 |
| D93A | DESADV | 00002 | Despatch Advice Message | BGM | Beginning of message | 01 | M | 0000000 |
| D93A | DESADV | 00003 | Despatch Advice Message | DTM | Date/time/period | 01 | C | 0000001 |
| D93A | DESADV | 00004 | Despatch Advice Message | ALI | Additional information | 01 | C | 0000000 |
| D93A | DESADV | 00005 | Despatch Advice Message | MEA | Measurements | 01 | C | 0000000 |
| D93A | DESADV | 00006 | Despatch Advice Message | G01 | Segment Group 1 | 01 | C | 0000001 |
| D93A | DESADV | 00007 | Despatch Advice Message | RFF | Reference | 02 | M | 0000000 |
| D93A | DESADV | 00008 | Despatch Advice Message | DTM | Date/time/period | 02 | C | 0000001 |
| D93A | DESADV | 00009 | Despatch Advice Message | G02 | Segment Group 2 | 01 | C | 0000000 |
| D93A | DESADV | 00010 | Despatch Advice Message | NAD | Name and address | 02 | M | 0000000 |
| D93A | DESADV | 00011 | Despatch Advice Message | LOC | Place/location identific | 02 | C | 0000001 |
| D93A | DESADV | 00012 | Despatch Advice Message | G03 | Segment Group 3 | 02 | C | 0000001 |
| D93A | DESADV | 00013 | Despatch Advice Message | RFF | Reference | 03 | M | 0000000 |
| D93A | DESADV | 00014 | Despatch Advice Message | DTM | Date/time/period | 03 | C | 0000001 |
| D93A | DESADV | 00015 | Despatch Advice Message | G04 | Segment Group 4 | 02 | C | 0000000 |
| D93A | DESADV | 00016 | Despatch Advice Message | CTA | Contact information | 03 | M | 0000000 |
| D93A | DESADV | 00017 | Despatch Advice Message | COM | Communication contact | 03 | C | 0000000 |
| D93A | DESADV | 00018 | Despatch Advice Message | G05 | Segment Group 5 | 01 | C | 0000001 |
| D93A | DESADV | 00019 | Despatch Advice Message | TOD | Terms of delivery | 02 | M | 0000000 |

FIG. 19A

162

| DIRECTORY | SEGMENT | SEGMENT CODE NAME | SINGLE/COMPOUND ELEMENT | LEVEL | MANDATORY | NAME |
|---|---|---|---|---|---|---|
| D93A | AGR | AGREEMENT IDENTIFICATI | C543 | 01 | C | AGREEMENT TYPE IDENTIFICATION |
| D93A | AGR | AGREEMENT IDENTIFICATI | 7431 | 02 | M | Agreement type qualifier |
| D93A | AGR | AGREEMENT IDENTIFICATI | 7433 | 02 | C | Agreement type, coded |
| D93A | AGR | AGREEMENT IDENTIFICATI | 1131 | 02 | C | Code list qualifier |
| D93A | AGR | AGREEMENT IDENTIFICATI | 3055 | 02 | C | Code list responsible agency, |
| D93A | AGR | AGREEMENT IDENTIFICATI | 7434 | 02 | C | Agreement type description |
| D93A | AGR | AGREEMENT IDENTIFICATI | 9419 | 01 | C | SERVICE LAYER, CODED |
| D93A | AJT | ADJUSTMENT DETAILS | 4465 | 01 | M | ADJUSTMENT REASON, CODED |
| D93A | AJT | ADJUSTMENT DETAILS | 1082 | 01 | C | LINE ITEM NUMBER |
| D93A | ALC | ALLOWANCE OR CHARGE | 5463 | 01 | M | ALLOWANCE OR CHARGE QUALIFIER |
| D93A | ALC | ALLOWANCE OR CHARGE | C552 | 01 | C | ALLOWANCE/CHARGE INFORMATION |
| D93A | ALC | ALLOWANCE OR CHARGE | 1230 | 02 | C | Allowance or charge number |
| D93A | ALC | ALLOWANCE OR CHARGE | 5189 | 02 | C | charge/allowance description, |
| D93A | ALC | ALLOWANCE OR CHARGE | 4471 | 01 | C | SETTLEMENT, CODED |
| D93A | ALC | ALLOWANCE OR CHARGE | 1227 | 01 | C | CALCULATION SEQUENCE INDICATOR |
| D93A | ALC | ALLOWANCE OR CHARGE | C214 | 01 | C | SPECIAL SERVICES IDENTIFICATIO |
| D93A | ALC | ALLOWANCE OR CHARGE | 7161 | 02 | M | Special services, coded |
| D93A | ALC | ALLOWANCE OR CHARGE | 1131 | 02 | C | Code list qualifier |
| D93A | ALC | ALLOWANCE OR CHARGE | 3055 | 02 | C | Code list responsible agency, |
| D93A | ALC | ALLOWANCE OR CHARGE | 7160 | 02 | C | Special service |

| ATTRIBUTE | MINIMUM NUMBER OF DIGITS | MAXIMUM NUMBER OF DIGITS | REPEAT COUNT |
|---|---|---|---|
| AN | 0000 | 0003 | 00000001 |
| AN | 0000 | 0003 | 00000001 |
| AN | 0000 | 0003 | 00000001 |
| AN | 0000 | 0003 | 00000001 |
| AN | 0000 | 0070 | 00000001 |
| AN | 0000 | 0003 | 00000001 |
| AN | 0000 | 0003 | 00000001 |
| N | 0000 | 0006 | 00000001 |
| AN | 0000 | 0003 | 00000001 |
|  |  |  | 00000001 |
| AN | 0000 | 0035 | 00000001 |
| AN | 0000 | 0003 | 00000001 |
| AN | 0000 | 0003 | 00000001 |
| AN | 0000 | 0003 | 00000001 |
|  |  |  | 00000001 |
| AN | 0000 | 0003 | 00000001 |
| AN | 0000 | 0003 | 00000001 |
| AN | 0000 | 0003 | 00000001 |
| AN | 0000 | 0035 | 00000001 |

| DIRECTORY | ELEMENT | NAME | ATTRIBUTE | MINIMUM NUMBER OF DIGITS | MAXIMUM NUMBER OF DIGITS | CODE SET |
|---|---|---|---|---|---|---|
| D93A | 1001 | Document/message name, coded | AN | 0000 | 0003 | 0 |
| D93A | 1004 | Document/message number | AN | 0000 | 0035 | 0 |
| D93A | 1049 | Message section, coded | AN | 0000 | 0003 | 0 |
| D93A | 1050 | Sequence number | | 000 | 000 | 0 |
| D93A | 1052 | Message item number | AN | 0000 | 0035 | 0 |
| D93A | 1054 | Message sub-item number | N | 0000 | 0006 | 0 |
| D93A | 1073 | Document line indicator, cod | AN | 0000 | 0003 | 0 |
| D93A | 1082 | Line item number | N | 0000 | 0006 | 0 |
| D93A | 1131 | Code list qualifier | AN | 0000 | 0003 | 0 |
| D93A | 1153 | Reference qualifier | AN | 0000 | 0003 | 0 |
| D93A | 1154 | Reference number | AN | 0000 | 0035 | 0 |
| D93A | 1156 | Line number | AN | 0000 | 0006 | 0 |
| D93A | 1159 | Sequence number source, code | AN | 0000 | 0003 | 0 |
| D93A | 1218 | Number of originals of docum | N | 0000 | 0002 | 0 |
| D93A | 1220 | Number of copies of document | N | 0000 | 0002 | 0 |
| D93A | 1222 | Configuration level | N | 0000 | 0002 | 0 |
| D93A | 1225 | Message function, coded | AN | 0000 | 0003 | 0 |
| D93A | 1227 | Calculation sequence indicat | AN | 0000 | 0003 | 0 |

| DIRECTORY | COMPOUND ELEMENT | COMPOUND ELEMENT CODE NAME | SEQUENCE | ELEMENT | ELEMENT CODE NAME |
|---|---|---|---|---|---|
| D93A | C002 | DOCUMENT/MESSAGE NAME | 00001 | 1001 | Document/message name, |
| D93A | C002 | DOCUMENT/MESSAGE NAME | 00002 | 1131 | Code list qualifier |
| D93A | C002 | DOCUMENT/MESSAGE NAME | 00003 | 3055 | Code list responsible |
| D93A | C002 | DOCUMENT/MESSAGE NAME | 00004 | 1000 | Document/message name |
| D93A | C040 | CARRIER | 00001 | 3127 | Carrier identification |
| D93A | C040 | CARRIER | 00002 | 1131 | Code list qualifier |
| D93A | C040 | CARRIER | 00003 | 3055 | Code list responsible |
| D93A | C040 | CARRIER | 00004 | 3128 | Carrier name |
| D93A | C045 | BILL LEVEL IDENTIFICATION | 00001 | 7436 | Level one ID |
| D93A | C045 | BILL LEVEL IDENTIFICATION | 00002 | 7438 | Level two ID |
| D93A | C045 | BILL LEVEL IDENTIFICATION | 00003 | 7440 | Level three ID |
| D93A | C045 | BILL LEVEL IDENTIFICATION | 00004 | 7442 | Level four ID |
| D93A | C045 | BILL LEVEL IDENTIFICATION | 00005 | 7444 | Level five ID |
| D93A | C045 | BILL LEVEL IDENTIFICATION | 00006 | 7446 | Level six ID |
| D93A | C056 | DEPARTMENT OR EMPLOYEE DETA | 00001 | 3413 | Department or employee |
| D93A | C056 | DEPARTMENT OR EMPLOYEE DETA | 00002 | 3412 | Department or employee |

FIG. 22A

| RECORD LAYOUT REGISTER | | | | | | | | |
|---|---|---|---|---|---|---|---|---|
| CANCEL 190-1 | REGISTER 190-2 | GROUP DEFINITION | FIELD DEFINITION | COPY | DELETE | PRECEDING PAGE ⇧ | NEXT PAGE ⇩ | PRINT |

LAYOUT CODE  TEST0010  EIAJ
176  172
MODE  FIXED LENGTH
174

| SEQ | | SEQ (NAME) 178 | ATTRIBUTE 180 |
|---|---|---|---|
| 0001 | 9(5) | DATA PROCESSING NO. | N |
| 0002 | X(4) | INFORMATION SEGMENT CODE | AN |
| 0003 | X(12) | ORDER-ISSUER CODE | AN |
| 0004 | X(23) | ORDER RECEIVER CODE | AN |
| 0005 | X(3) | ORDER NUMBER CODE | AN |
| 0006 | 9(6) | CORRECTION CODE | N |
| 0007 | 9(3) | ORDER DATE | N |
| 0009 | X(10) V(3) | UNIT PRICE | AN |
| 0012 | 9(1) | UNIT SEGMENT | N |
| 0013 | X(9) V(3) | ORDER QUANTITY | AN |
| 0014 | X(10) | ORDER-ISSUER ARTICLE CODE | AN |
| 0015 | X(25) | PLACE OF DELIVERY | AN |
| 0016 | X(8) | | AN |
| 0024 | 0031-1-034 REPEAT COUNT:3 | FREE USE COLUMN | |
| 0055 | X(20) | AMOUNT OF CONSUMPTION TAX | AN |
| 0060 | 9(10) | SUM TOTAL | N |
| 0061 | | | N |

ROUTE 0001 0002 0003 0004 0005 0006 0007 0008 0009 0010 0011 0012 0013 0014 0015 0016 0017 0018

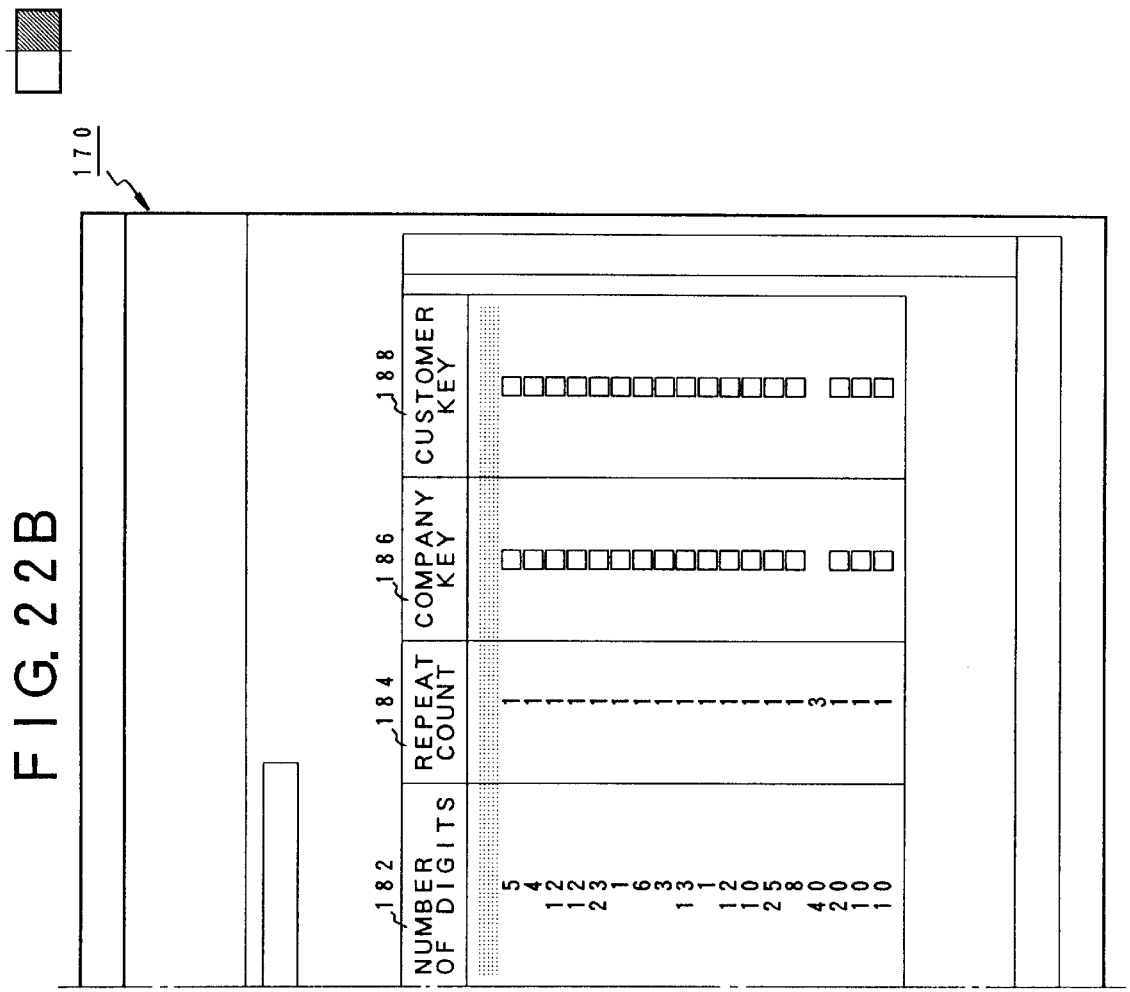

FIG. 24

| SYSTEM CODE | DIRECTORY CODE | ELEMENT CODE | SYSTEM VARIABLE |
|---|---|---|---|
| 0001 | D96A | 0052 | @SYSVER |
| 0002 | D96A | 0054 | @SYSREL |
| 0003 | D96A | 0060 | @SYSMSG |
| 0011 | D96A | 1836 | @SYSBINARYFILE |
| 0012 | D96A | 1838 | @SYSBINARYSIZE |
| 0013 | D96A | 1839 | @SYSBINARYDIR |
| 0014 | D96A | 1840 | @SYSBINARYSEQ |

ELECTRONIC TRANSACTION APPARATUS AND COMPUTER READABLE STORAGE MEDIUM ON WHICH IS RECORDED CONTROL PROGRAM FOR EXECUTING FORMAT CONVERSION IN ELECTRONIC TRANSACTION

BACKGROUND OF THE INVENTION

1. Field of the Invention

The present invention relates generally to an electronic transaction apparatus provided with a function allowing a conversion between an electronic transaction local message having a user proper local format and an electronic transaction message having a standard format such as EDIFACT and to a computer readable storage medium in which is recorded a control program for executing a format conversion in an electronic transaction, and more particularly to an electronic transaction apparatus provided with a mapping function ensuring an effective setting of link indicative of correspondence between items of both the messages upon the creation of a conversion table for use in a message conversion and to a computer readable storage medium having therein recorded a control program for executing a format conversion in an electronic transaction.

2. Description of the Related Art

Up to now, an EDI (Electronic Data Interchange) system is rapidly spreading on an international scale beyond individual countries, the EDI system performing inter-business transactions such as order placing/receiving of commodities and article management by use of electronic messages. Conventional EDI system has a relatively strong localism. In Japan for example, development has been promoted of the EDI systems proper to individual types of business. In the electric industry for example, EIAJ standard has been provided which is promoted by the Electronic Industries Association of Japan. However, actual inter-business transactions have been widespread beyond individual industries, with the result that in Japan CII syntax rule has been provided as a national standard EDI and in the US ANSI X. 12 has been provided. Moreover, EDIFACT is an international standard EDI and is prevailing mainly in Europe. Then, it is desired in the near future that a global EDI system is constructed on a global scale through a switchover to the international standard, INTEREDIF in both the US and Japan.

However, the EDI system which has currently been put to practical use deals with electronic messages in conformity with the user proper local formats which can be industrial standards. In order to ensure a smooth switchover to the international standard EDIFACT while effectively utilizing the local formatted resources, importance is attached to the function of a translator for performing exchange between electronic messages in conformity with the local formats of individual enterprises and electronic messages in conformity with the standard format. The translator necessitates a conversion table indicative of correspondence between local format items and standard format items, so that a mapping operation for creating the conversion table results in an essential operation. In the process of mapping for creating the conversion table, the operator ordinarily performs an operation linking the standard format items with the local format items corresponding thereto. However, a single message, one unit of the electronic transaction messages, consists of e.g., one thousand order items, which requires a considerable amount of work for linking.

Furthermore, the messages often have a complicate structure such as a nest structure for items, with the result that the mapping operation for linking the standard items and local items necessitates enormous time and labor.

SUMMARY OF THE INVENTION

According to the present invention, there is provided an electronic transaction apparatus ensuring a simple and effective mapping operation for linking items used in a message conversion between a standard format and a local format.

The electronic transaction module of the present invention comprises an application module, a local format file, a translator, a standard format file and a communication module. The translator comprises a conversion unit consisting of a transmission converting unit and a reception converting unit and performs a format conversion between a electronic local transaction message (hereinafter, referred to as "local message") which has been generated by a user application module in accordance with a local format proper to the user and a standard transaction message (hereinafter, referred to as "standard message") in conformity with a standard format which is transmitted or received through a communication network. In addition to the conversion unit, the translator comprises a relevance information setting unit for imparting the same relevance information to related items (hereinafter, referred to "elements") of the standard message to indicate a relevance, and a mapping processing unit for displaying side by side the standard message and the local message on the same display, referring to relevance information imparted to the standard message items to define the link with the local message items on the screen and creating a conversion table for use in the message format conversion by the conversion unit. According to such an electronic transaction apparatus of the present invention, the user is capable of easily linking the related elements by previously imparting the same relevance code to the related elements like e.g. "date" and "year" which are independent of each other but are related to each other in terms of business, to thereby indicate the relevance codes upon the mapping.

The mapping processing unit displays side by side a standard message element structure and a local message element structure on a display and, when a link has been set by selecting a local message element corresponding to a standard message element, displays a link line between the two elements. This enables the user to visually grasp the link structure between the elements of the local message and the standard message and facilitates a complicated mapping operation. Upon the selection on the display of a local message element corresponding to the standard message element to set a link, the mapping processing unit also performs an identification display such as a flicker and an inverse display of other elements having the same relevance code as that of the link set element, to urge the user to effect a link of the remaining related elements. The mapping processing unit checks, upon the selection on the display of the standard message element and of the local message element to perform linking, the matching of the two elements, and if they match each other, displays a link line indicating a link relationship, but if they are mismatched, inhibits the setting of the link relationship. This matching check includes an attribute check of the standard message element and the local message element, displaying a line indicative of a link relationship if the two elements coincide in attribute with each other, and inhibiting the setting of the link relationship if they are not coincident in attribute with each other. The attribute check includes checking of whether an electronic message is of numeric type (N), text type (A) or combination type (AN) of the numeric type and the text type. The mapping processing unit further checks the matching in data length of the standard message element and the local message element, and if the two elements coincide in data length with each other, displays a link line, but if they are not coincident in data length with each other, inhibits the setting of a link relationship. Upon the registration into the conversion table after link through the selection on the display of a local message element corresponding to a standard message element, the mapping processing unit makes a check to see if there is an element which has not yet been input, and if any, instructs the user to perform the input operation. In case a reselection has been made of a standard message element displayed on the display after having once created and registered the conversion table, the mapping processing unit displays a link line between that standard message element and a local message element corresponding thereto on the basis of the link information of the conversion table. Also, in the case where after the creation and register of the conversion table, a standard message has been displayed on the display to allow the user to designate a range of a plurality of elements to reselect the elements, the mapping processing unit displays a plurality of link lines between the standard message elements and a local message element corresponding thereto on the basis of link information of the elements contained within the range designated in the conversion table. Upon the display of an element structure of a standard message 50 and an element structure of a local message, the mapping processing unit displays at a reduced scale the elements of each message so as to allow the user to verify the related elements over the entire message. A specific example of the contraction display includes grouping by a plurality of elements upon the contraction display and merging for display the related information and link display lines since even though the elements resulting in line orders have been reduced in scale it is impossible to display all of them at one time. Upon a selection of grouped message elements in this group element display, the mapping processing unit performs a detailed display of a plurality of elements constituting the thus selected group.

The electronic transaction device of the present invention further comprises a system variable table in which is stored a relation between elements constituting a standard transaction message and system variables to which predetermined system values are assigned, and a system variable setting unit which when elements of the standard transaction message registered into the system variable table by the mapping processing unit are linked with elements of the local message, assigns system variables registered in the system variable table to the elements of the standard transaction message to register them into the conversion table. Then, at the time when a format conversion is carried out by the conversion unit, corresponding system values are assigned to the system variables for the delivery to the conversion object. By assigning the system variables to the standard message elements in this manner, on the basis of the system variable table in which are registered relations between any system values and system variables, upon the mapping for linking the standard message elements and the local message elements, it becomes possible for the system values on the user application which are not defined in either of the local and standard formats to be automatically interchanged relative to the other user devices, thus facilitating the system management of the user device. The conversion unit comprises a transmission converting unit which converts for transmission the electronic local message information generated by the user application in accordance with the user proper local format, to the standard message information in conformity with the standard format, and a reception converting unit which converts an externally received standard message to local message information to provide to the user application. The standard format of the present invention is an EDIFACT format which is an international standard. The standard format may be a national standard ANSI X.12 or CII syntax rule format.

The present invention further provides a computer readable storage medium in which is recorded a control program for executing a format conversion on an electronic transaction. This storage medium stores therein a control program for executing a format conversion on an electronic transaction and is provided with a relevance information setting module for imparting the same relevance information to a plurality of related elements of a standard message to indicate a relevance, a mapping module which displays side by side on the same display the standard transaction message having the relevance information imparted thereto and the electronic local message generated by the user application in accordance with the user proper local format and while referring to the relevance information added to the elements constituting the standard message, defines the link with the local message elements to create a conversion table, and a conversion module for performing a format conversion in accordance with the conversion table between the local message provided by the user application and the standard message in conformity with the standard format transmitted and received through the network. Details of the computer readable storage medium having therein recorded a control program for executing a format conversion on this electronic transaction are basically same as the case of the electronic transaction apparatus.

The above and other objects, features, and advantages of the present invention will become more apparent from the following detailed description with reference to the accompanying drawings.

BRIEF DESCRIPTION OF THE DRAWINGS

FIG. 1 is a block diagram of an EDI system to which the present invention is applied;

FIG. 4 is an explanatory view of a display of a standard message;

FIG. 7 is an explanatory view of a link line display performed by selecting a region of the items;

FIGS. 8A and 8B are explanatory views of a contracted display of a mapping register display;

FIG. 9 is an explanatory view of a contracted display by grouping in case of an impossible overall contracted display;

FIG. 10 is a flowchart of mapping register processing of FIG. 1;

FIG. 11 is a flowchart following the mapping register processing of FIG. 10;

FIGS. 12A and 12B are explanatory views of the mapping register display exemplifying an EDIFACT standard message and an EIAJ local message;

FIGS. 13A and 13B are explanatory views of the mapping register display after linking in FIGS. 12A and 12B;

FIG. 15 is an explanatory view of an EDIFACT message type;

FIG. 16 is an explanatory view of the EDIFACT message type following FIG. 15;

FIG. 17 is an explanatory view of the EDIFACT message type following FIG. 16;

FIG. 18 is an explanatory view of a message table exemplifying an EDIFFACT message "DESADV";

FIGS. 19A and 19B are explanatory views of an EDIFACT segment table;

FIG. 20 is an explanatory view of a single data element table used in EDIFACT;

FIG. 21 is an explanatory view of a compound data element table used in EDIFACT;

FIGS. 22A and 22B are explanatory views of an EIAJ local record layout register display of FIGS. 13A and 13B;

FIG. 24 is an explanatory view of a system variable table in which system values have been set by FIG. 23.

DETAILED DESCRIPTION OF THE PREFERRED EMBODIMENT (System Configuration and Translator)

FIG. 1 is a block diagram of an EDI system using an electronic transaction apparatus in accordance with the present invention. The EDI system interconnects user devices 10-1, 10-2 and 10-3 by way of a communication network 12. The exchange of messages in the form of electronic transaction messages among the user devices 10-1 to 10-3 via the communication network 12 is performed in conformity with e.g., an international standard format of EDIFACT known as an international standard EDI system. As opposed to the EDIFACT international standard format for the exchange of messages among such user devices 10-1 to 10-3, user application side of, e.g., the user devices 10-1 and 10-2 deals with messages in conformity with their respective local formats intrinsic to the users. For this reason the user devices 10-1 and 10-2 need a translator for converting the user intrinsic local formatted messages to the EDIFACT international standard formatted messages. That is, application modules 14-1 and 14-2 of the user devices 10-1 and 10-2, respectively, process EDI messages in conformity with the local formats intrinsic to the users. Available for the local formats of the EDI messages dealt with by the application modules 14-1 and 14-2 are for instance the standards of EIAJ (Electronic Industries Association of Japan). The application modules 14-1 and 14-2 are provided with local format files 16-1 and 16-2, respectively, for storing therein local messages produced in conformity with the local formats. The local format files 16-1 and 16-2 are followed by translators 18-1 and 18-2, respectively, which serve to mutually convert messages between the local format files 16-1, 16-2 and international format files 20-1, 20-2, respectively. The international format files 20-1 and 20-2 store therein a variety of format information required for the exchange of messages in compliance with the EDIFACT international standard, as well as actually transmitted and received messages. Communication modules 22-1 and 22-2 carry out communication for message exchanges among the user devices by way of the communication network 12. Since the communication protocol is not particularly specified in the EDIFACT international standard, any appropriate communication software such as e.g., CORDEX is available. The user device 10-3 on the other hand comprises an application module 14-3, an international standard format file 20-3 and a communication module 22-3. Since the application module 14-3 conforms to the EDIFACT international standard, the user device 10-3 is capable of a message exchange in conformity with the EDIFACT international standard directly from the application module 14-3 by means of the communication module 22-3 without needing any translator for the local format exchange.

Figure 2:
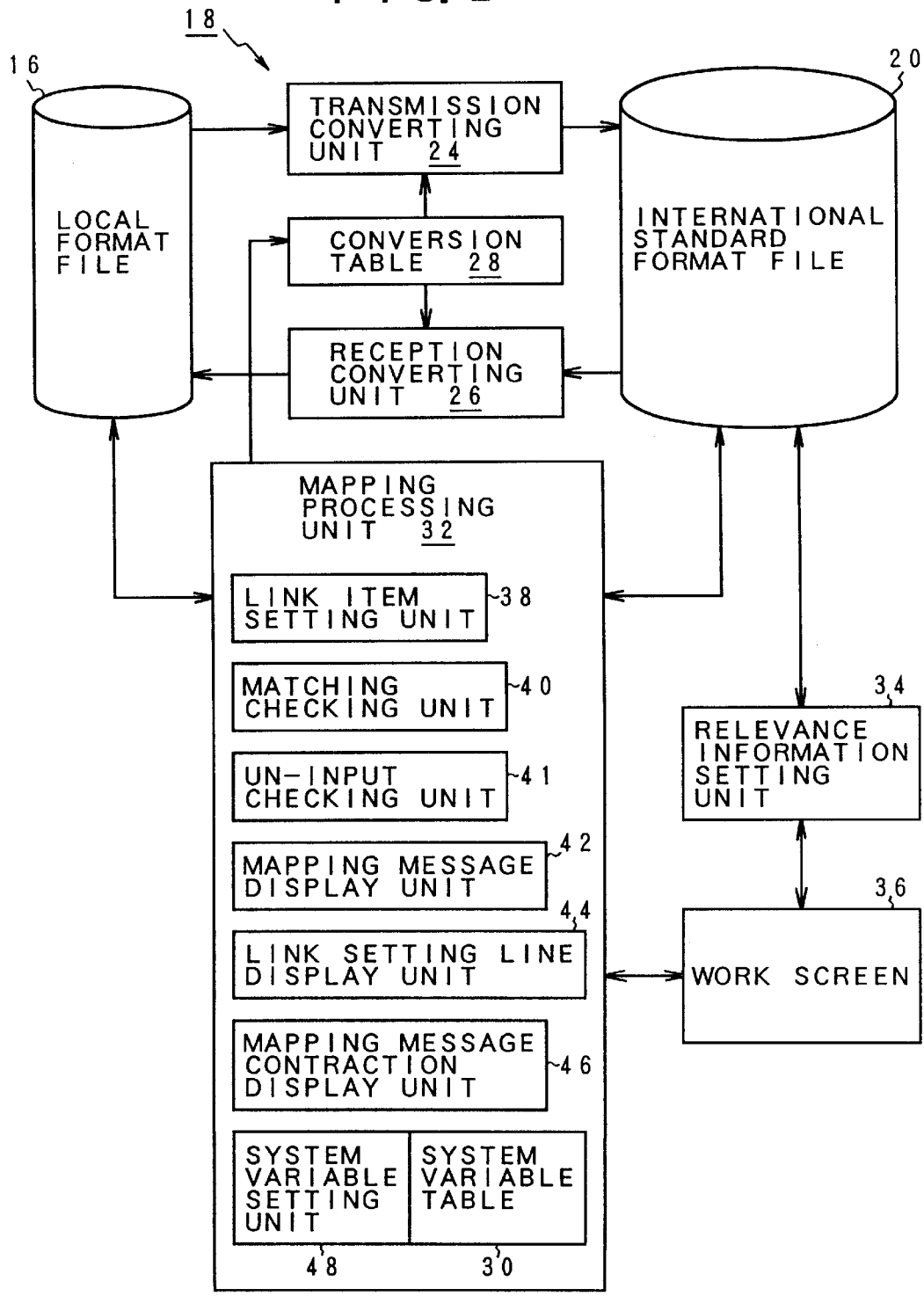
FIG. 2 is a functional block diagram of a translator of FIG. 1.

FIG. 2 is a functional block diagram of the translators 18-1 and 18-2 incorporated in the user devices 10-1 and 10-2, respectively, of FIG. 1. The translator 18 used in the present invention comprises a transmission converting unit 24, a reception converting unit 26, a conversion table 28, a mapping processing unit 32, a relevance information setting unit 34 and a work screen 36 for use in the mapping. The transmission converting unit 24 picks out a stored local message for transmission and converts it to a standard message in conformity with the EDIFACT international standard, which in turn is stored in the international standard format file 20 and then is transferred to the other user device by means of the communication module as illustrated in FIG. 1. The reception converting unit 26 picks out a standard message which has been received from the other user device and stored in the international standard format file 20, converts it to a local message, which in turn is stored in the local format file 14, and supplies the received local message to the application module as illustrated in FIG. 1. The conversion table 28 stores link information which indicates a correlation between elements constituting a local message and elements making up a standard message. By referring to the link information of the local elements and the standard elements upon the conversion by the transmission converting unit 24 or the reception converting unit 26, a format conversion can be implemented between the local message and the standard message. The conversion table 28 for use in such transmission conversion and reception conversion is in advance created and registered for each message type by the mapping processing unit 32. The mapping processing unit 32 for creating the link information of the local elements and the standard elements to be registered in the conversion table 28 comprises a link item setting unit 38, a matching check unit 40, an un-input checking unit 41, a mapping message display unit 42, a link setting line display unit 44 and a mapping message contraction display unit 46. The mapping processing unit 32 further comprises a user system variable setting unit 48 and a system variable table 30. The mapping processing for creating the element link information by the mapping processing unit 32 is briefly summarized hereinbelow. A standard message and a local message are juxtaposed on the work screen 36 to register the link information by setting a correlation for each element making up each message by a mouse click or the like. In order to facilitate linking of the elements of the standard message and the local message, the relevance information setting unit 34 is provided in the present invention. The relevance information setting unit 34 invokes an arbitrary standard message from the international standard format file 2 onto the work screen 36 and sets the same relevance codes for related elements in the standard message. The elements of the standard message include elements which are independent of each other as elements but are related with each other in terms of business. For instance, "date" and "year" are independent of each other as elements but is used in association with each other in terms of business. In the case of such elements, mapping operation will become complicated if local elements to be linked independently for "date" and "year" is sought separately when linking the elements of the standard message and the local message in the mapping processing unit 32. Thus, in the present invention, with regard to the elements such as "date" and "year" which are independent of each other as elements but are related with each other in terms of business, the standard messages are invoked onto the work screen 36 by the relevance information setting unit 34 to add the same relevance code to the related elements for grouping, thereby ensuring an easy mapping operation for providing link with the local message items on a group-to-group basis.

Figure 3:
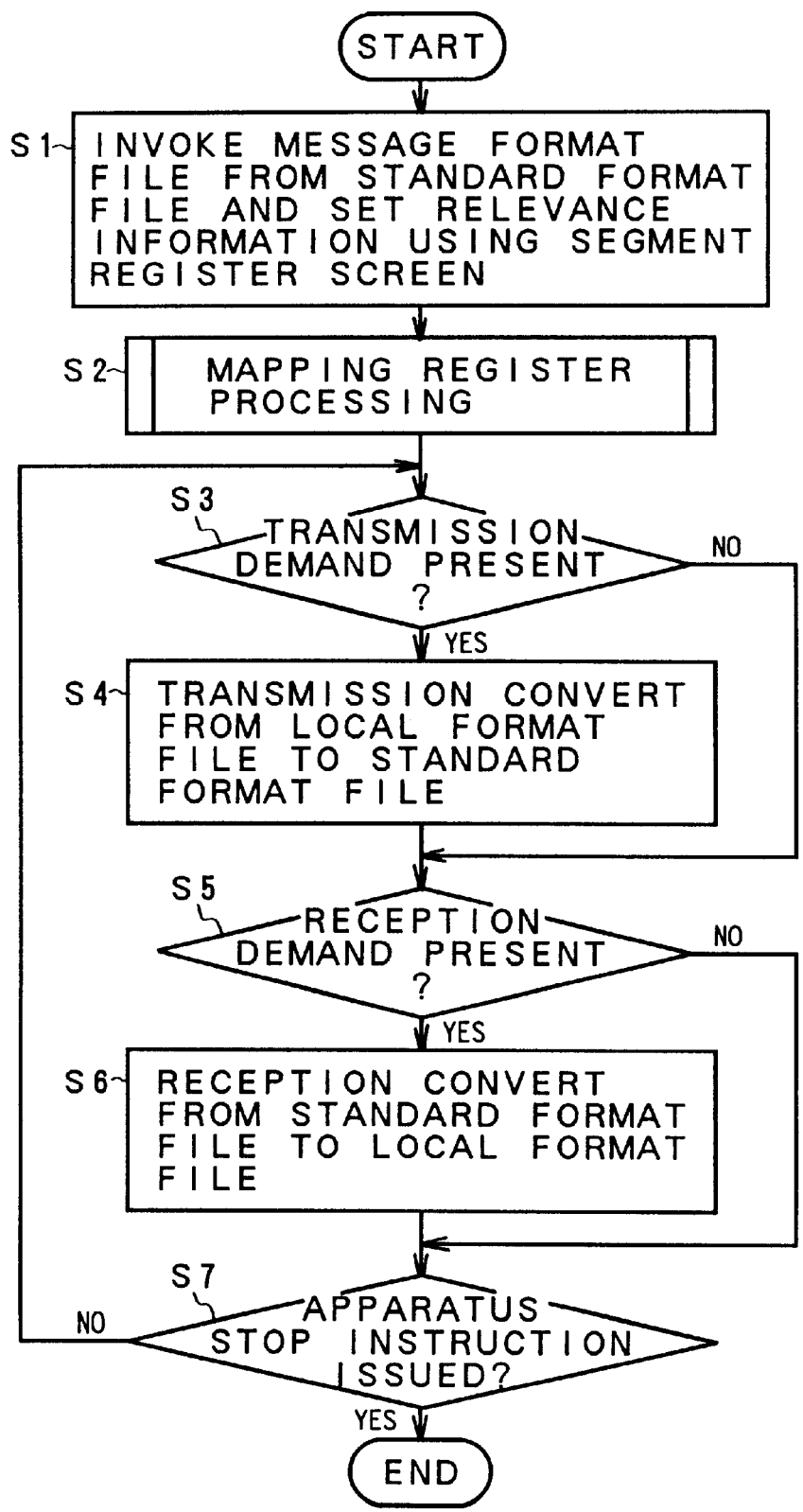
FIG. 3 is a flowchart of an overall processing action of a user device including processing of the present invention provided in the EDI system of FIG. 1.

FIG. 3 is a flowchart of an overall procedure to be performed in the translator 18 of FIG. 2. First, in step S1, relevance information is set by means of the relevance information setting unit 34. FIG. 4 schematically illustrates a standard message 50 appearing on the work screen for use in the relevance information setting processing in step S1 of FIG. 3. The standard message 50 conforms to the EDIFACT international standard and includes a tag indication part 54 and a data part 56. The tag indication part 54 expresses standard message elements in the form of tag information. A single EDIFACT message consists of more than a hundred segments for instance, one of which is displayed as a segment tag like the tag indication part 54 of FIG. 4. For example, a message "DESADV" consists of 97 segments, a message "INVOIC" consists of 281 segments and a message "ORDERS" consists of 207 segments. The segment tag includes a plurality of elements. The elements making up the segment have a hierarchical nest structure In the tag indication part 54 of FIG. 4, the segment tag is provided with four element tags, the last element tag having three element tags based on the nest structure. The data part 56 following the tag indication part 54 includes items of e.g., mandatory, attribute, maximum number of digits, minimum number of digits and repeat count, as the information in conformity with the EDIFACT standard format, for each of the element tags making up the segment tag. In the present invention, in addition to such data items in conformity with the EDIFACT standard format, a relevance code storage region 75 is newly provided for each element tag. In step S1 of FIG. 3, the standard message 50 as shown in FIG. 4 is invoked onto the work screen and the same relevance codes are set in the relevance code storage region 75 for the related elements while making a check of the contents of the element tags displayed on the tag indication part 54. For example, the element tags 62 provided in the tag indication part 54 have relevance to the element tags 68, so that the same relevance codes "01" are placed inside the relevance code storage region. Referring again to FIG. 3, after the completion of setting of the relevance information in step S1, sequence goes to step S2 in which with the standard message and the local message being juxtaposed on the work screen 36 in the mapping processing by the mapping processing unit 32, links are formed between the elements of the messages and registered in the conversion table 28. This mapping processing will become more apparent from a description to be made later. When the conversion table 28 for the translator 18 has been created by the mapping processing of step S3, it becomes possible to mutually convert the local message and the standard message by means of the transmission converting unit 24 and the reception converting unit 26.

Furthermore, in the present invention, previous to the process of converting the local message and the standard message, the system variable table 30 is created by the system variable setting unit 48 provided in the mapping processing unit 32. Assigned to a system variable within the system variable table 30 is a predetermined system value which has been selected and set in the system variable setting unit 48 for each of the standard message elements. The system variable is not defined on the local message and the standard message but is a systemic value which is generated and managed by the application modules 14-1 to 14-3 of the user device of FIG. 1. The system variable includes for instance execution date, execution day/time etc. In the present invention, by assigning such a system variable which is not dealt with on the message to a specific element of the standard message by means of the system variable table 30, a designated system value is assigned to this system variable at the time of conversion of the local message and the standard message, thereby making it possible to exchange the system values among the user devices as parameters of the elements apparently making up the message. The system variable will also become more apparent from a description to be made later.

Referring again to FIG. 3, upon the completion of registration of the conversion table 28 and the system conversion table 30, the exchange of message with the other user device becomes possible. When a message transmission demand is judged to have been issued in step S3, the transmission converting unit 24 is activated in step S4 to convert a transmitted local message picked out from the local format 14 to a standard message, which in turn is stored in the international standard format file 20 and is transmitted to a designated user device by way of the communication module. When a reception demand is judged to have been issued in step S5, the reception converting unit 26 fetches a received standard message stored in the international standard format file 20 which is a target for the reception demand, and reception converts from the standard message to a local message, which in turn is stored in the local format file 16 and is provided to the user application module side. Such mutual conversion between the local message and the standard message resulting from the transmission/reception of steps S3 to S6 will be repeated until an apparatus stop instruction is issued in step S7.

(Link Mapping)

Figure 5:
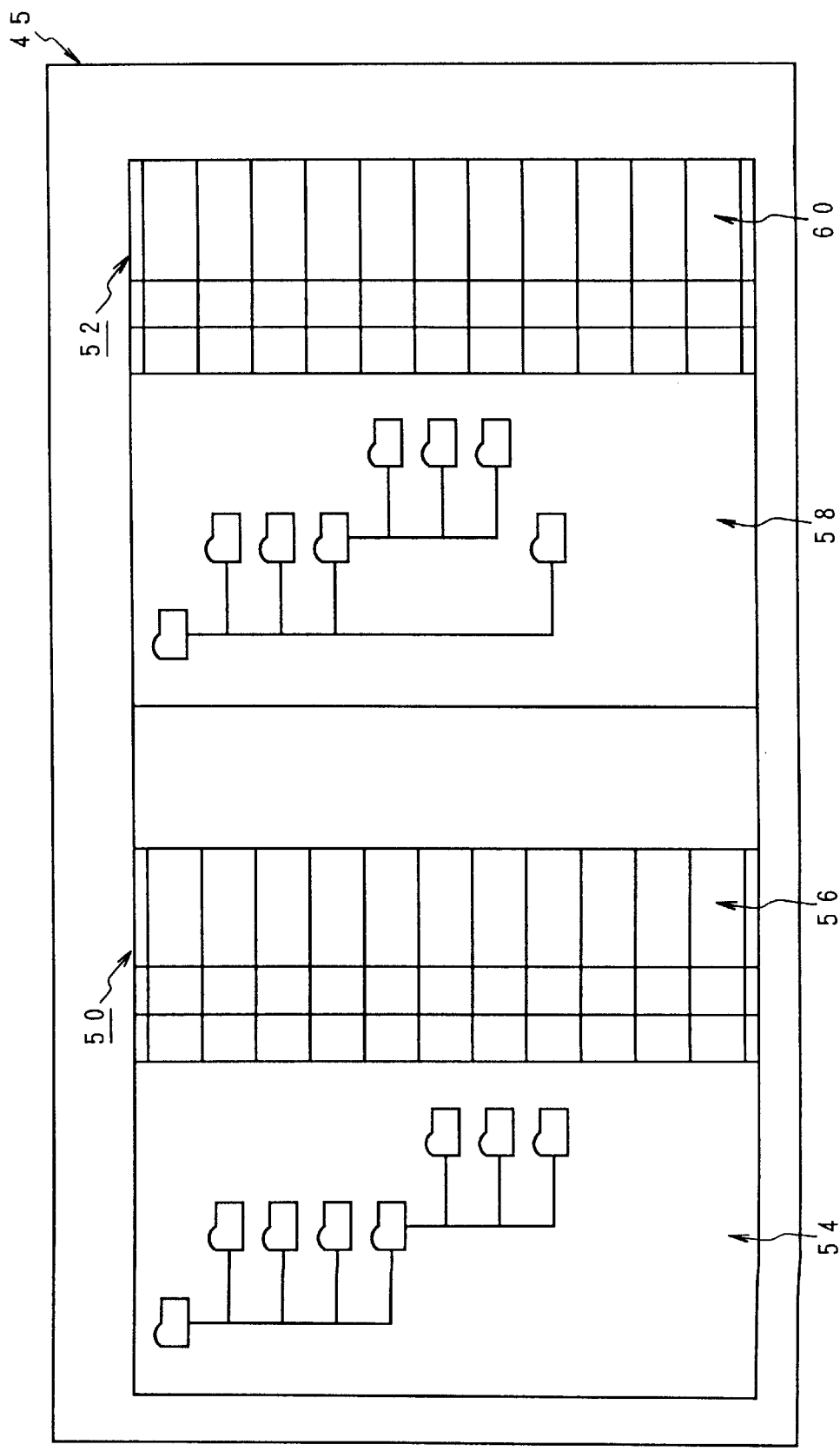
FIG. 5 is a schematic explanatory view of a mapping register display implemented by a mapping processing unit of FIG. 1.
Figure 6:
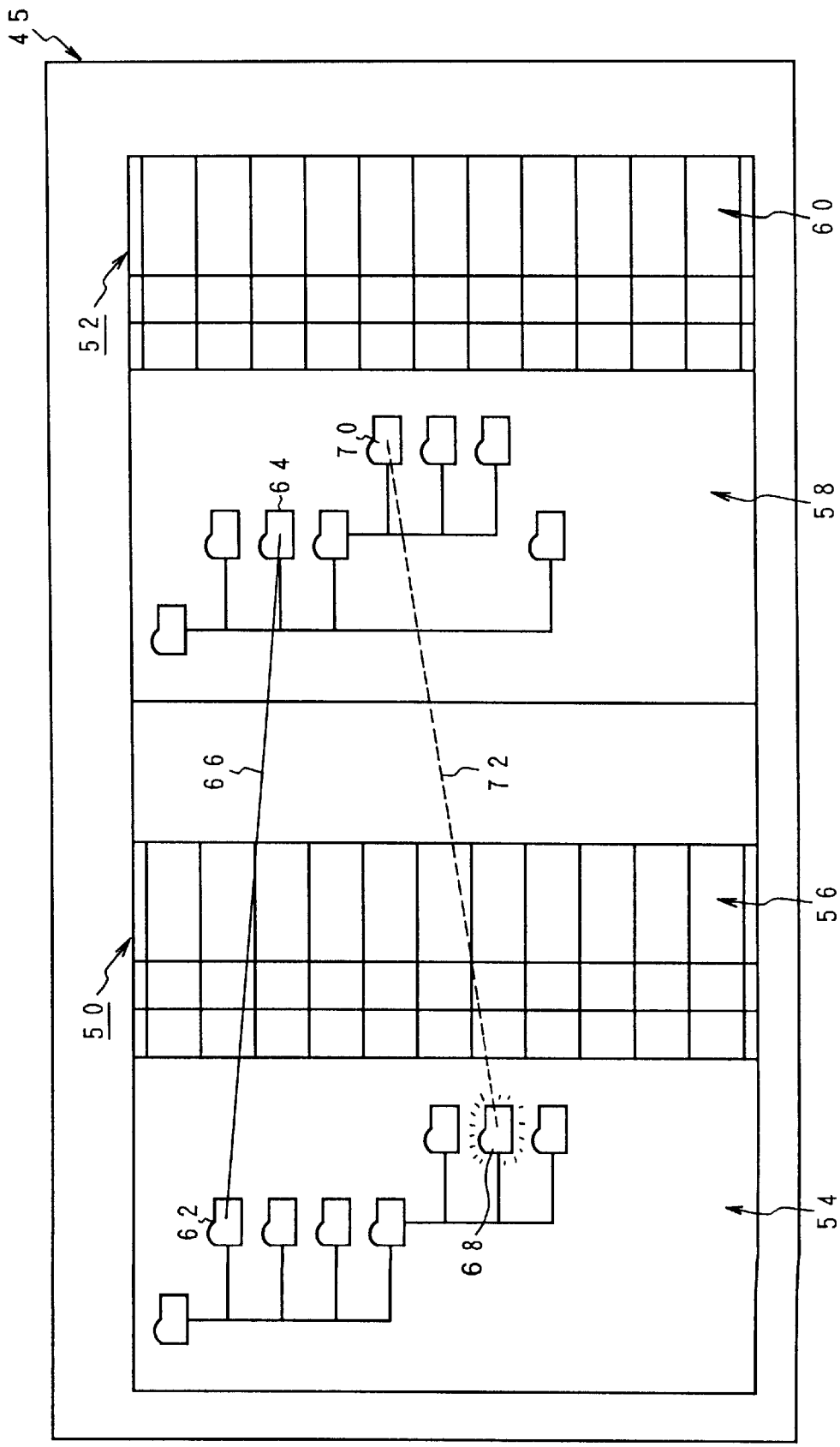
FIG. 6 is an explanatory view of linking performed by selecting items.

Description will be made of link mapping for correlating the items of the standard message by means of the mapping processing unit 32 of FIG. 2. FIG. 5 depicts a mapping register display 45 for use in mapping operation for linking the standard message items and the local message items by the mapping processing unit 32. The mapping register display 45 displays on its left half an arbitrary standard message 50 and on its right half a local message in a juxtaposed manner. The standard message 50 and the local message 52 include tag indication parts 54 and 58, respectively, representing message structures and data parts 56 and 60, respectively, storing therein data on elements making up each message. In the present invention, the data part 56 of the standard message 50 includes a relevance code storage region 75 in addition to EDIFACT data such as mandatory, attribute, etc., as shown in FIG. 4. The mapping register display 45 of FIG. 5 is implemented through an access to the local format file 16 and to the international standard format file 20 by the mapping message display unit 42 provided in the mapping processing unit 32 of FIG. 2. Then, as shown in FIG. 6, by selecting with a mouse click an element tag 63 in the tag indication part 54 of the standard message 50 displayed on the mapping register display 45 and by selecting with a mouse click an element tag 64 in the local message 52 corresponding to the element tag 62, there appears a link line 66 representing a link of the element tag 62 with the element tag 64. Although the link line 66 may be displayed by mouse clicking the element tags 62 and 74, the link line 66 may be displayed by mouse clicking the element tag 62, dragging it as far as the element tag 64 in the local message 52 and releasing it. By virtue of the display of the link line 66 by the selection of the element tag 62 of the standard message 50 and the element tag 64 of the local message 52, the relation of link between the elements of the two messages is imagerially presented to the operator. In the present invention, when the linking of the element tag 62 of the standard message 50 is completed, another element tag, e.g., an element tag 68 having the same relevance code as the relevance code set in the element tag 62 will flicker to indicate to the operator that it is relevance information of the linked element tag 62. Naturally, instead of the flicker, the element tag 68 may be inversely displayed or turned into a distinguished color. By virtue of this, the operator can immediately recognize that the flickering element tag 68 is relevance information of the element tag 62 which has already been linked. Then, the element tag 68 within a group having the same relevance code is linked with, e.g., an element tag 70 of the local message 52 to allow a link line 72 to be displayed. The link line display upon the linking between the element tags of the standard message and of the local message is carried out by the link setting line display unit 44 provided in the mapping processing unit 32 of FIG. 2. Furthermore, when the element tag 62 of the standard message 50 is linked with the element tag 64 of the local message 52 on the mapping register display 45 of FIG. 6, matching is checked by the matching check unit 40 of FIG. 2. The matching check includes I. attribute check, and
II. data length check.

In the case of the EDIFACT standard format, the element attribute includes three code types, i.e., text type A, numeric type N and combination type AN of the text type and the numeric type, and any codes of A, N and AN are set in the attribute region as shown in FIG. 4. The same applies to the local message elements. Then, the attributes of the standard elements are compared with the attributes of the local elements. If (A•A), (N•N) or (AN•AN) is established, the matching is judged to be present, allowing the linking to be performed. In the case of the other combinations than the above, the linking is inhibited due to lack of matching. As regards the data length, there are provided the maximum number of digits and the minimum number of digits as well as the repeat count as shown in FIG. 4 for e.g. the standard message elements. Typically, the local format elements are fixed length data whereas the EDIFACT standard format elements are variable length data. Thus, let the data length given by the maximum number of digits of the standard format be L1, and let the data length given by the maximum number of digits of the local format be L2. If upon the transmission, $$(\text{standard data length } L1) \geq (\text{local data length } L2) \quad (1)$$

then, linking is performed due to the presence of matching. On the contrary, if $$(\text{standard data length } L1) < (\text{local data length } L2) \quad (2)$$

then it is impossible for the variable length standard elements to serve due to the lack of the number of digits, thus inhibiting the linking. It is to be appreciated that upon the reception the signs of inequality in the expressions (1) and (2) are reversed. However, in case this data length check has been judged to be mismatched, it is possible to make effect the linking by setting for the local elements the conditions which match data length of the standard elements. For instance, if the number of digits of the local element exceeds the maximum number of digits of the standard element, the matching condition for the expression (1) can be satisfied by setting a condition to make effect the first number of digits of the local element corresponding to the maximum number of digits of the standard element. Description of the data length applies to the repeat count. If the repeat count of the standard element is equal to or greater than the repeat count of the local element, then the linking is performed, whereas if the repeat count of the standard element is less than the repeat count of the local element, then the linking is inhibited. After the completion of the linking between the elements of the standard message 50 and the local message 52 appearing on the mapping register display 45 in this manner, the operation for registering the link information into the conversion table 28 of FIG. 3 is carried out on the display, allowing the un-input checking unit 41 provided in the mapping processing unit 32 to perform check processing. That is, for the link setting of the elements of the standard message 50 and the local message 52, there is provided mandatory information within the data part 56 as seen on the display of standard message 50 of FIG. 4 for instance. In the region of this mandatory information, a code M is set if mandatory and a code C is stored if conditional. At the time of registration onto the conversion table 32, the un-input checking unit 41 checks the elements of the standard message 50 to see if the link information has already been set for the elements with the mandatory region code M. Unless any element with the code M has undergone the linking, the work screen 36 displays the presence of the un-input element to urge the operator to perform link setting of the element which has not yet been input. It is desirable in this case that the element tag in the standard message 50 which has not yet been input on the work screen be flickered, inversely displayed or turned into a different display color in the same manner as the element tag 68 in the case of the relevance codes on the mapping register display 45 of FIG. 6 for instance, to thereby specify the presence of the un-input element to the operator to facilitate the linking.

FIG. 7 illustrates a case where after the mapping processing has once been performed and the link information has been registered into the conversion table 28, the mapping register display 45 is again invoked for display, for example a case where the linking is additionally performed of the elements with the code C indicating that it is conditional. In this case, when an element tag within the standard message 50 is clicked by the mouse on the mapping register display 45, if the linking is complete, then the link line 66 appears between that element tag and the local message 52 side element tag as illustrated in FIG. 6. The display of link line in FIG. 7 is such that when a rectangular area 76 is set for a plurality of element tags of the standard message 50, link lines 77-1 to 77-3 based on the already set link information appear jointing between e.g., three element tags 76-1, 76-2 and 76-3 contained within the area 76 and element tags 78-01, 78-2 and 78-3, respectively. As a result of this, in the additional linking operations after the mapping processing has once been completed, it is easy to identify the elements which have already undergone the linking.

Figure 8A:
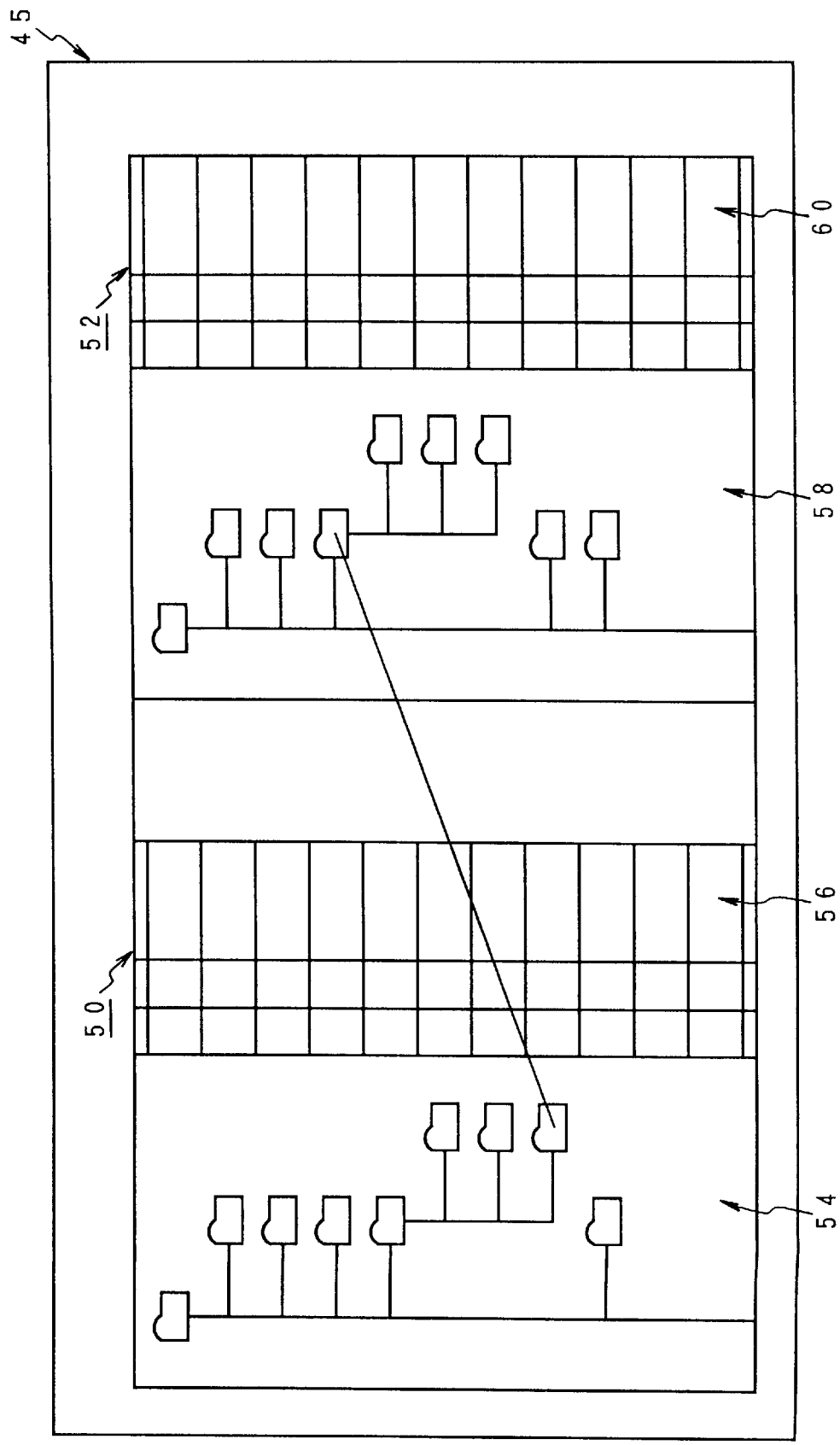

FIGS. 8A and 8B illustrate display processing of the mapping message contraction display unit 46 provided in the mapping processing unit 32 of FIG. 2. FIG. 8A is associated with the mapping register display 45 in a normal display mode, in which there appear only the leading portions of the standard message 50 and the local message 52. That is, the EDIFACT standard message consists of 200 to 300 segments, each segment including several to ten several elements. Accordingly, a single message is an order including an enormous number of, that is, more than one thousand elements. Although about one hundred elements with the mandatory code M of the multiplicity of elements actually require the linking operation, it is impossible to display the element configuration over the entire message on the mapping register display 45. For this reason, in the normal operation, the message display is vertically scrolled to perform the linking between the element, which makes it difficult for the operator to recognize the overall state of operation. Thus, when the contraction mode is set on the display, the mapping message contraction display unit 46 provided in the mapping processing unit 32 of FIG. 2 serves to switch the display to a contraction display of the standard message 50 and the local message 52 as illustrated in FIG. 8B for instance. This contraction display enables the linking over the entire message to be performed and verified. It is however impossible for the simple contraction display as illustrated in FIG. 8B to display the entirety of an order having more than one thousand elements. Therefore, as shown in FIG. 9, 200 to 300 segments constituting a single message are grouped by a predetermined number, for instance, by 10 segments and are converted into segment group tag displays indicated by segment groups 1, 2, 3, . . . N. As regards the relevance information 75, the relevance codes of the elements contained in each segment are merged to display a relevance code "01" for instance on group-to-group basis. Here, in case a single group contains different relevance codes, the minimum relevance code among the plurality of relevance codes is displayed so as to allow a display of switching to the next relevance code by mouse clicking the relevance code. In the local message 52 as well, correspondingly with the standard message 50, the sequence numbers are grouped in the same manner as the segment group side to tag display as sequence groups 1, 2, 3, 4, . . . N. Furthermore, as regards link lines 77-4 and 77-5, the link lines on the element-to-element basis contained a group are merged for display. In this case, when the linking is performed on a plurality of relevance codes, different colors of the link lines are displayed.

As a result of this, even though one order includes as many as more than one thousand elements, the segment grouping enables the relevance codes and the link lines to be merged for display, making it possible for the operator to grasp the entire message by virtue of the contraction display. In the mapping operation using this grouped contraction display, for e.g. the segment group 1 a normal display is opened as illustrated in FIG. 8A to perform linking and, after the completion of the linking, is returned to a contraction display as illustrated in FIG. 10 to allow the operator to recognize a segment group 4 having the same relevance code as the relevance code "01" of the segment group, and then the segment group 4 is opened to perform linking on the normal display returned as illustrated in FIG. 8A.

FIGS. 10 and 11 is a flowchart of register processing by the mapping processing unit 32 of FIG. 2. First, in step S1 the mapping register display is invoked as illustrated in FIG. 5, and in step 2 under this state an element of the standard message 50 to be linked is made active by a mouse click or the like. Then the sequence goes to step S3, in which a check is made to see if any link related register has already been performed into the conversion table 32. In the case of a first mapping register which has not undergone the link related register, the sequence goes to step S4, in which an element of the local message 52 to be linked is made active by a mouse click. Then, in step S5 a link button provided on the register display is operated by a mouse click to check in step S6 the matching of the two items, namely, of the two elements. This matching check includes an attribute check and a data length check. If in step S7 matching is judged to be present, the sequence goes to Step S8, in which a link line is displayed between the standard and local elements. Subsequently, in step S9 a check is made to see if any unprocessed element is present which has the same relevance code as one added to the link line displayed standard element, if any element having the same relevance code is present, then in step S10 the element having the same relevance code is flickered for instance. If in step S9 any unprocessed element having the same relevance code is absent, then in step S11 a check is made to see if registering operation into the conversion table has been performed, and the sequence goes back to S2 for linking the following elements. On the contrary, if the link relation of the standard message element activated in step S2 has already been registered into the conversion table 32, the sequence skips to step S8 without performing the processing of steps S4 to S7. In the step S8 a link line is immediately displayed between the standard and local elements on the basis of the registered link information. When such a series of processing of element-to-element linking has been performed to allow the operator to judge to have completed the operation and in step S11 the registering operation into the conversion table has been decided, the sequence goes to step S12 of FIG. 11, in which a check is made of the link items which have not yet been input. That is, a check is made to see if standard elements with a code M in the mandatory region have already undergone the linking operation. Unless the standard elements with the mandatory code M have undergone the linking operation, un-input is judged in step S13 allowing the sequence to go back to step S2 in which the linking operation is again carried out. It is desirable at that time that the un-input elements be flickered for instance to inform the operator of the un-input. If no in-input link items have been judged in step S13, then the sequence advances from S13 to step S14, in which the registering of the link information into the conversion table 28 is performed to complete a series of mapping processing.

(EDIFACT Mapping)

Figure 12B:
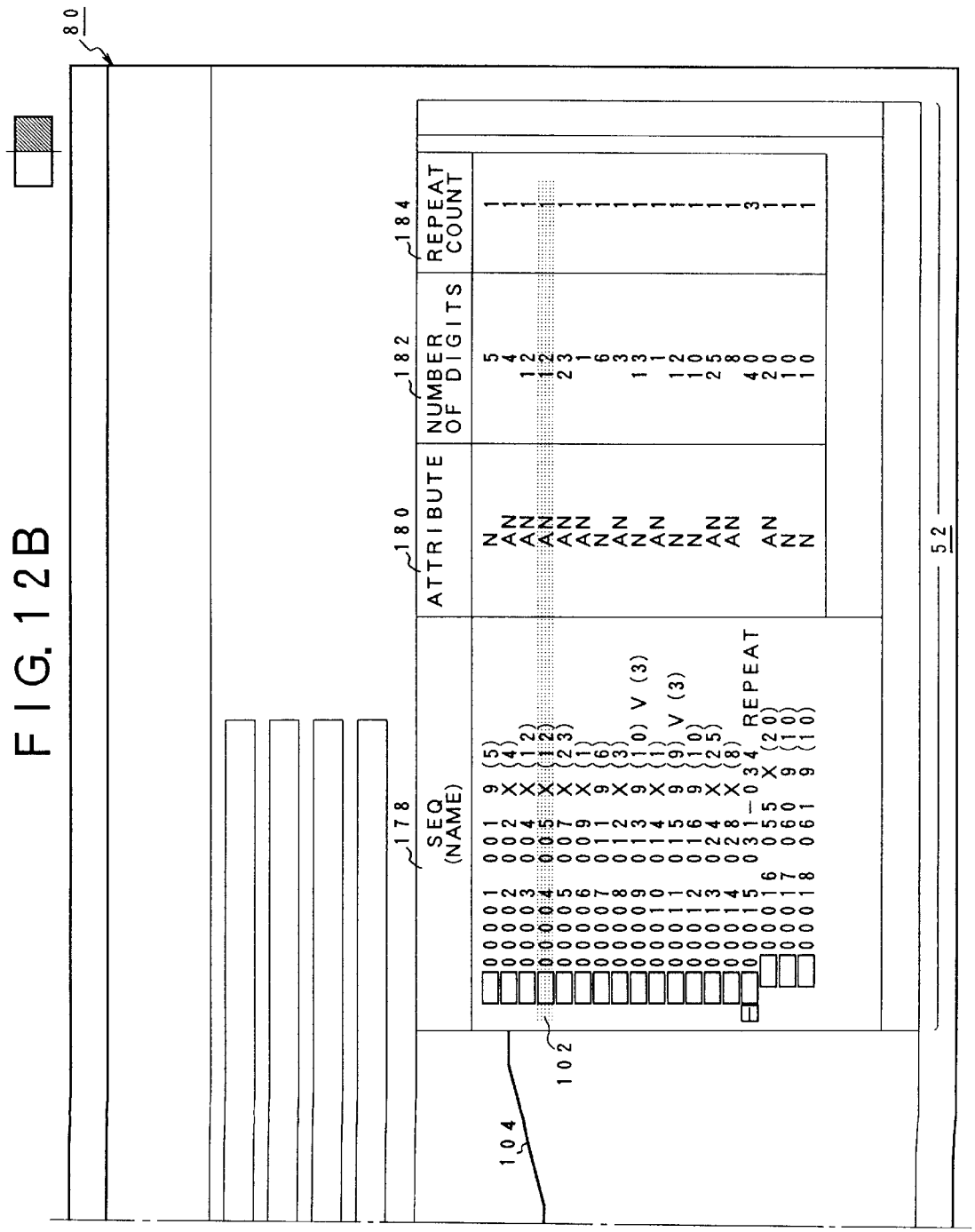
Figure 13A:
Figure 13B:
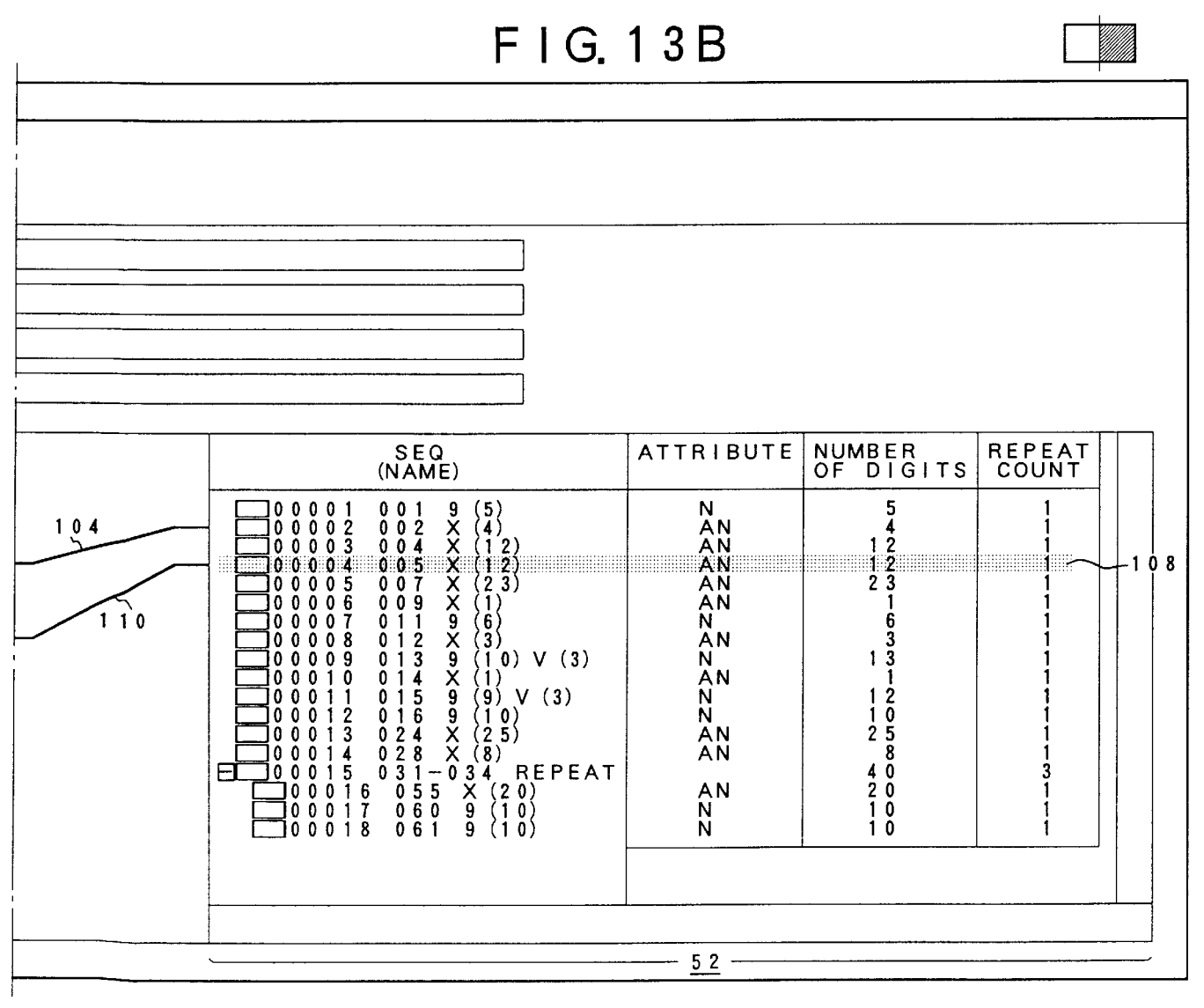

FIGS. 12A and 12B and FIGS. 13A and 13B illustrate specific examples of a mapping register display 80 implemented by the mapping processing unit 32 of FIG. 1, with FIGS. 12A and 13A bearing the EDIFACT standard message 50, and with FIGS. 12B and 13B bearing EIAJ local message 52. An upper row of the mapping register display 80 includes a cancel key 96-1, a register key 96-2, a tree development key 96-3, a preceding page key 96-4, a next page key 96-5, a set key 96-5, a link key 96-7, a link release key 96-8 and a print key 96-9. A column below includes items of mapping code, directory code, layout code and message code. Among them, the layout code "TEST0010" indicates the type of the EIAJ message resulting in a local message and the following message code "ORDERS" indicates the type of the EDIFACT message. A display column of the standard message 50 includes columns of segment/element (name) 82, relevance information 75, mandatory information 86, attribute information 88, maximum number of digits 90, minimum number of digits 92 and repeat count 94. In connection with the region of the segment/element 82, tag codes and a nest structure in accordance with a standard message hierarchical structure are shown in FIG. 14.

Figure 14:
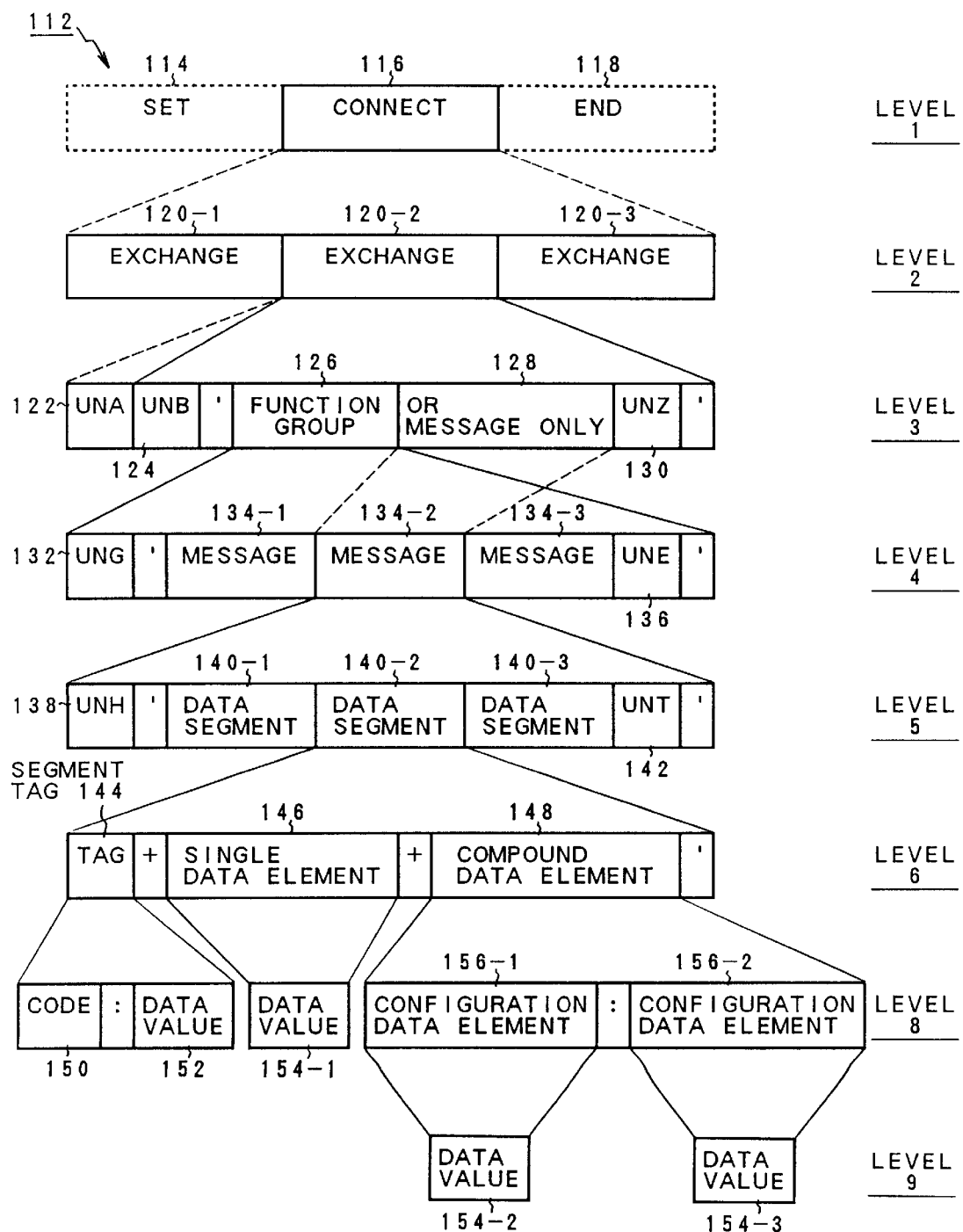
FIG. 14 is an explanatory view of an EDIFACT message structure.

In the message hierarchical structure of FIG. 14, an uppermost level 1 includes for the transfer data between user terminal devices a connect region 116 in conformity with the EDIFACT standard format, which is sandwiched by a set region 114 and an end region 118. The set region 114 and the end region 118 conform to the protocols of the communication modules 22-1 to 22-3 of FIG. 1 and are not specifically defined in the IDIFACT international standard. As shown in level 2 in an exclusive manner, the connect region 116 includes a single exchange region or a plurality of exchange regions, for instance, exchanges 120-1 to 120-3. The intermediate exchange 120-2 for instance among the exchanges 120-1 to 120-3 includes as shown in level 3 in an exclusive manner a service string information 122 indicated by a service segment UNA, an exchange header 124 indicated by a service segment UNB, a function group 126 or a message only 128 and an exchange trailer 130 indicated by a service segment UNZ. The function group 126 includes as shown in level 4 in an exclusive manner a function group header 132 indicated by a service segment UNG, a plurality of messages of the same type, e.g., messages 134-1 to 134-3, and a function group trailer 136 indicated by a service segment UNE. On the contrary, the message only 128 is limited to the intermediate message 134-2 for instance. The message 134-2 includes as shown in level 5 in an exclusive manner a message header 138 indicated by a service segment UNH, a plurality of data segments, e.g., data segments 140-1 to 140-3 and a message trailer 142 indicated by a service segment UNT. The data segments 140-1 to 140-3 each include, as shown in level 6 in an exclusive manner for the intermediate segment 140-2 for instance, a segment tag 144, a single or a plurality of single data elements 146 and a single or a plurality of compound data elements 148. The foremost segment tag 144 includes as shown in level 7 in an separate manner a segment code 150 and a data value 152 for imparting repetition/nest value. The single data element 146 is an aggregate of data values 154-1. The compound data element 148 is provided with a plurality of configuration data elements, e.g., two configuration data elements 156-1 and 156-2. The configuration data elements 156-1 and 156-2 have respective data values 154-2 and 154-3 as shown in level 8 and it will be appreciated that the single data elements 146 are grouped.

Available as the messages 134-1 to 134-3 of level 4 in the hierarchical structure of FIG. 14 are ones shown in FIGS. 15, 16 and 17 by way of example. FIGS. 15 and 16 illustrate a message having a classification of "order receiving/issuing relation", with a message tag including "INVOIC", "ORDERS", "ORDCHG", . . . "PRDSPE" by way of example, and with a definition of message code function on the right hand corresponding to each message tag. In the mapping register display 80 of FIGS. 12A and 12B for instance, there is invoked "ORDERS" at the second section of FIG. 15 as a message code, which is a message specifying details about articles and services ordered under terms agreed between a seller and a buyer. FIG. 17 illustrates a message having a classification of "articles/management", with "DELFOR" "DELJIT" "DESADV", . . . DISRPT as the message tag. Other various messages than the above are provided for the EDIFACT, and a total of 189 messages have been prepared at the present time.

FIG. 18 illustrates part of a message table 160 provided for each of the message types shown in FIGS. 15 to 17, the message table being associated with the third section message "DESADV" in the classification "articles/management" of FIG. 17 by way of example. In this message table 160, directory code is followed by message tag "DESADV" and then by information on name, segment code, segment code name, level, mandatory and repeat count for each sequence SEQ 1, 2, . . . N.

Figure 19B:
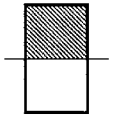

FIGS. 19A and 19B illustrate an example of a segment table 162 for defining the data segments 140-1 to 140-3 in level 5 constituting the message 134-2 of FIG. 14. From left to right, the segment table 162 has items of directory code, segment code, segment code name, single/compound element code, level, mandatory, name, attribute, minimum number of digits, maximum number of digits and repeat count. For example, on lines 1 to 7 of the segment table 162 there is defined a segment code "AGR" which includes a single/compound element codes C543, 7431, . . . 9419. Herein, the element code with a letter C at its head represents a compound data element and the element code without the letter C represents a single data element.

FIG. 20 illustrates a single data element table 164 in which are defined the single data elements provided in the segment table 162 of FIGS. 19A and 19B. From left to right, the single data element table 164 defines directory code, element code, name, attribute, minimum number of digits, maximum number of digits, etc.

FIG. 21 illustrates a compound data element table 166 in which are defined the compound data elements used in the segment table 162 of FIGS. 19A and 19B. From left to right, the compound element table 166 stores directory code, compound element code, compound element code name, sequence, element code and element code name. In other words, the compound data element defines an aggregate of the single data elements of FIG. 20. For example, the same compound element code C002 is set on lines 1 to 4 of the compound data element table 166 and stores single element codes 1001, 1131, 3055 and 1000. In the standard message 50 on the left side of the mapping register display 80 of FIG. 12A, by designating the message code "ORDERS", there is displayed the message table 160 which comprises an aggregate of the segment codes as illustrated in FIG. 18, that is, the content of the level 4 in the hierarchical structure of FIG. 14. Then, by mouse clicking a specific data segment folder mark and acting on the tree development key 96-3 at the top of the display, a development is made into detailed element structures of the level 5 and follow-on levels of FIG. 14. In the mapping register display 80 of FIGS. 13A and 13B, the topmost service segment (message header) UNH and the follow-up segment codes S009 and S010 are developed to display their element structures, with the subsequent segment codes BGM, DTM, etc., being closed. In the local message 52 of FIG. 13B on the other hand, there are displayed SEQ (name) 178 indicating an element structure, attribute information 180, number of digits 182 and repeat number 184. This local message 52 is an EIAJ local message like the layout code above and is a message which has been registered using a local record layout register display 170 of FIGS. 22A and 22B for instance.

Figure 23:
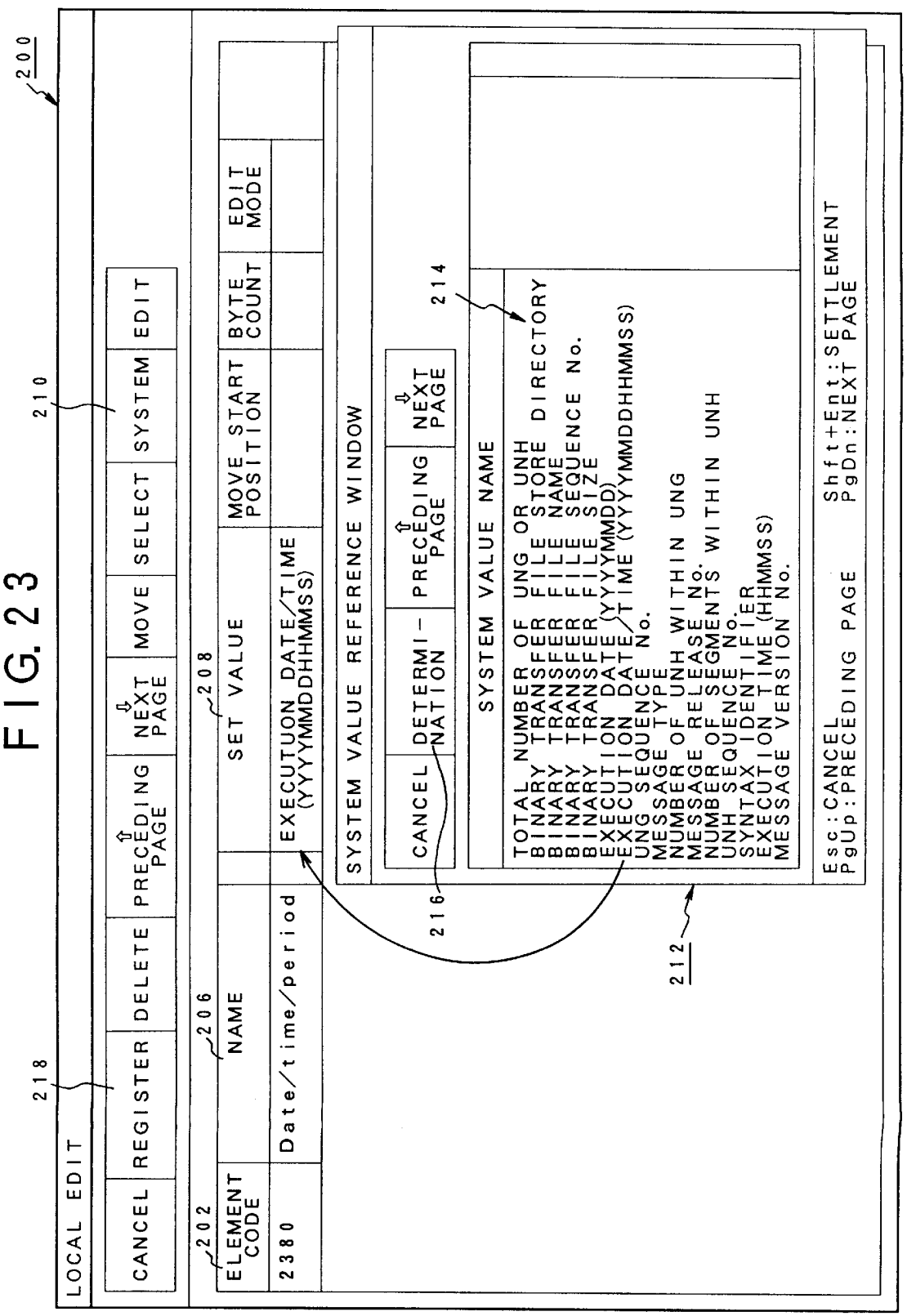
FIG. 23 is an explanatory view of a system value setting display for use in setting of system values of the present invention.

In the local record layout register display 170 of FIG. 22, there are used the EIAJ format having a layout code TEST0010, and a "fixed length" mode. The tag display part 176 is displaying in an element hierarchical structure the sequence Nos. 0001 to 0018 and fold marks. The tag display part 176 is rightward followed by SEQ (name) 178, attribute information 180, number of digits 182, repeat count 184, company key 186 and customer key 188. At the top of the display, there are arranged operation keys for cancel, register, group definition, copy, delete, preceding page and print. Then, at the time of mapping processing, a local message record of FIG. 23 is read out and displayed on the right side of the mapping register display 80 of FIGS. 12A and 12B. In the case of the mapping register display 80 of FIGS. 12A and 12B, a link line 104 has already been set between the standard message element code 0065 and the SEQ00002 of the local message 52. In the setting of this link line 104, a relevance code 01 is stored in the relevance code storage region 75 of the element code 0065 of the standard message 50. Therefore, upon the completion of the linking operation, the row associated with an element code 0057 having the same relevance code 01 in the standard message 50 results in an inverse display 100, thus urging the subsequent linking operation. Then, the operator selects for example an element of SEQ0004 as the element code in the right-hand local message 52 corresponding to the segment code 0057 which has resulted in the inverse display 100 on the basis of the relevance code 01, and activates it by a mouse click for switching to an inverse display 102.

An element-to-element matching check is made after the execution of the linking operation by activating both the standard element and the local element in this manner. First, as to the attribute information, the two elements match each other since they both have the common attribute code AN. As to the data length, the maximum number of digits of the standard element is 6 whereas that of the local element is 12, which does not meet the data length matching condition of expression (1). In this case, by acting on the setting key 96-6, the setting display is opened to set such a condition as to make effect the first six digits for example of the number of digit 12 of the local element so as to coincide with the maximum number of digits 6 of the standard element. As a result of this data length conditioning to the local element, the data length matching condition of expression (1) is satisfied. Furthermore, as to the repeat count, the two elements match each other since they both have the same repeat count 1. Accordingly, the matching check results in normal, so that a link line 110 appears between the standard element 0057 and the local element 00004 as illustrated in the layout register display 80 of FIGS. 13A and 13B. In like manner, the subsequent element-to-element linking is performed between the standard message 50 and the local message 52. In case the operator has failed in linking in this mapping operation, the link information is reset by erasing the link line through the operation of the link release key 96-8 shown at the top of FIGS. 13A and 13B. If a series of mapping operations are desired to be terminated, the register key 96-2 is operated to allow the link information to be registered into the conversion table 28. Upon this registration of the link information, an un-input check is made by the un-input checking unit 41 provided in the mapping processing unit 32.

(Setting and Conversion of System Variables)

FIG. 23 illustrates a system value setting display 200 on which relations between standard elements and system variables are registered into the system variable table 30 by means of the system variable setting unit 48 provided in the mapping processing unit 32 of FIG. 2. The system value setting display 200 can be displayed by reading out a local message edit display and allows a system value reference window 212 to be opened as shown by acting on a system key at the top of the display.

As system values capable of being set, the system value reference window 212 provides for e.g.:

I. the total number of UNT service segments (function group headers) or UNH service segments (message headers);
II. binary transfer file storage directory;
III. binary transfer file name;
IV. binary transfer file sequence No;
V. binary transfer file size;
VI. execution date (YYYYMMDD); and
VII. execution date/time (YYYYMMDDHHMMSS).

In such a system value reference window 212, an element code 2380 for example is set as the element code 202 of the system value setting display 200. Then, if a system value name "EXECUTION DATE/TIME (YYYYMMDDHHMMSS)" is selected in the system value reference window 212 and a determination key 216 is operated, "EXECUTION DATE/TIME (YYYYMMDDHHMMSS)" is assigned as the set system value to a set value zone within the region 202 of the element code 2380.

FIG. 24 illustrates an invoked display of the system variable table 30 which is created by use of the system value setting display 200 of FIG. 23 and stores therein system code, directory code, element code and system variable. By previously providing for such a system variable table 30 with the system variable setting unit 48 provided in the mapping processing unit 32 of FIG. 2, system variables "@SYSVER" and "@SYSREL" associated with system codes 001 and 002, respectively, on the first line and second line of the system variable table 30 of FIG. 24 are assigned as defaults into segment tag folders of the standard message 50 of FIG. 12A and 12B indicated by element codes 0052 and 0054, upon the mapping processing by use of the mapping register display 80 of FIGS. 12A and 12B for instance. Through the registering operation at the time of completion of the linking by use of the mapping register display 80, the conversion table 28 stores therein information on an element having a folder into which a system variable has been assigned as a default. Then, if there is recognized a correspondence with an element code with a system variable corresponding to a local element from the link information when converting a local message to a standard message by the transmission converting unit 24, a system value generated by the application module side is assigned into the folder of that element for the delivery to the standard element. Similarly, in the case where the reception converting unit 26 recognizes a system variable assigned to the standard element, the value of the system variable is fetched to provide the received system value to the application module which deals with the local message.

Figure 25:
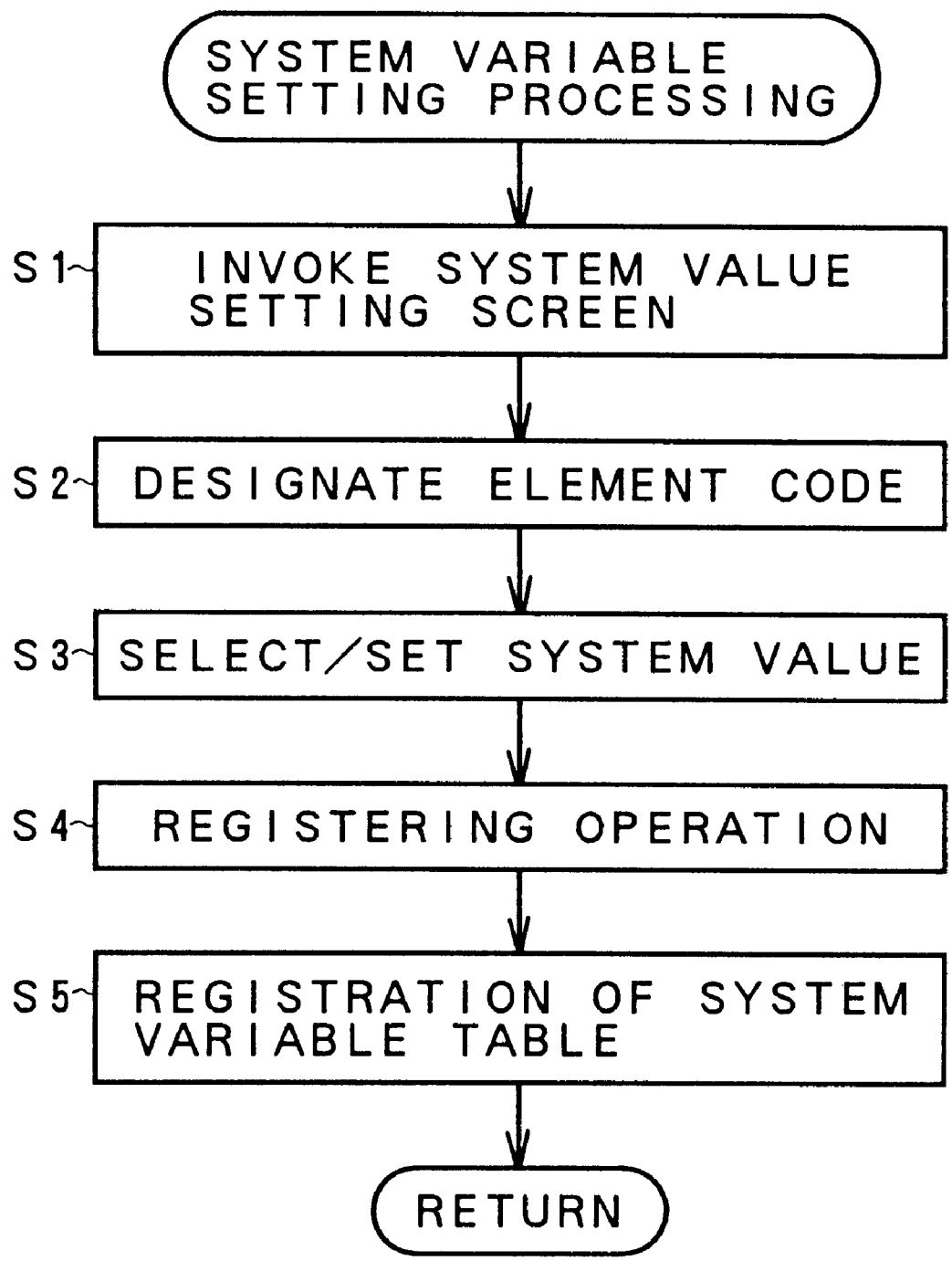
FIG. 25 is a flowchart of system variable setting processing in accordance with the present invention.

FIG. 25 is a flowchart of setting processing performed by the system variable setting unit 48 provided in the mapping processing unit 32 of FIG. 2. First, the system value setting display 200 of FIG. 23 is invoked in step S1, and then an element code for setting a system value is designated in step S2 to thereby open the reference window 212, allowing a set system value to be selectively set in step S3. Subsequently, a registering operation is performed by acting on the register key 218 in step S4, allowing in step S5 a system variable corresponding to the system value in response to the element code to be registered into the system variable table 30 as illustrated in FIG. 24.

According to the present invention as set forth hereinabove, the same relevance codes are previously added to related elements in the standard message with respect to the mapping performed when creating as a conversion table the link information on correlation of the elements (items) for use in a format conversion between the electronic local message and standard message, whereby the standard transaction message and the local transaction message are juxtaposed on the display to allow the elements having the same relevance code to be presented to the user upon the linking of elements, with the result that the user can grasp the related elements as a group among a plurality of elements to easily perform the linking operation.

Also, since a link line is displayed between the standard element and the local element upon the execution of linking, the user can visually grasp a link structure between the elements to perform a complicated mapping operation with ease.

Furthermore, by defining the relation of the standard element with the system variable having an arbitrary system value and registering it together with the link information, it becomes possible for parameters such as execution date dealt with on the system other then the intrinsic elements upon the message conversion to be automatically interchanged between the user devices by way of the message conversion, thus ensuring a simple and effective management of the system values other than the message between the user devices in the EDI system.

Although the above embodiment has employed as the standard format the international standard EDIFACT by way of example, other formats also available such as CII syntax rule which is currently provided as the national standard EDI in Japan or ANSI X.12 which is provided as the national standard. In such a case as well, due to the arrangement of the translator for converting a message between the local format and the standard formats in such a manner as illustrated in the system block of FIG. 1, the functions of the mapping processing unit 32 of the present invention as in FIG. 2 are applicable directly to this translator.

Also, the functions of the translator 18 for performing a conversion between the local message and the standard message used in the present invention of FIG. 2 are provided in the form of a program module for implementing the respective functions of the transmission converting unit 24, the reception converting unit 26, the mapping processing unit 32 and the relevance information setting unit 34, and are actually provided through a storage medium such as e.g., a CDROM, a floppy disk, a magnetic tape, etc. in which is stored a control program for executing a message format conversion in the EDI system, and further through a network as in the case of download on an internet, so that the functions of the translator as shown in FIG. 3 are realized by installing on the user device a program module provided in the form of the storage medium in the user device.

It is to be appreciated that the present invention is not intended to be limited to the above embodiment and that any modification or variant is possible insofar as the object of the present invention is not impaired.

What is claimed is:

1. An electronic transaction apparatus comprising:
    a conversion unit for performing a format conversion between a local transaction message generated by a user application in accordance with a local format proper to the user and a standard transaction message in conformity with a standard format transmitted and received through a network;
    a relevance information setting unit for imparting the same relevance information to related items in said standard transaction message to indicate a relevance; and
    a mapping processing unit which displays side by side said standard transaction message having said relevance information imparted thereto and said local transaction message on the same display, and while referring to relevance information imparted to the items of said standard transaction message, defines on the display link relations with the items of said local transaction message to register them into a conversion table for use in said translator format conversion.

2. An electronic transaction apparatus according to claim 1, wherein
    said mapping processing unit displays side by side an item structure of said standard transaction message and an item structure of said local transaction message on the display, and upon the selection for linking of an item of said local transaction message corresponding to an item of said standard transaction message, displays a link line between the two items.

3. An electronic transaction apparatus according to claim 2, wherein
    upon a selection for linking on the screen an item of said local transaction message corresponding to an item of said standard transaction message, said mapping processing unit performs an identification display such as a flicker and an inverse display of other items having the same relevance code as that of the linked items.

4. An electronic transaction apparatus according to claim 2, wherein upon a selection for linking on the display of an item of said local transaction message corresponding to an item of said standard transaction message, said mapping processing unit checks matching of the two items, and if they match each other, displays a link line, but if they are mismatched, inhibits the setting of the link.

5. An electronic transaction apparatus according to claim 4, wherein said mapping processing unit checks matching in attribute of an item of said standard transaction message and an item of said local transaction message, displays a link line if the two items coincide in attribute with each other, and inhibits the setting of link if they are not coincident in attribute with each other.

6. An electronic transaction apparatus according to claim 2, wherein in case a reselection has been made of an item of said standard transaction message displayed on the display after having once created and registered said conversion table, said mapping processing unit displays a link line between said standard transaction message item and said local transaction message item corresponding thereto on the basis of the link information in said conversion table.

7. An electronic transaction apparatus according to claim 4, wherein upon a registration into said conversion table after link through the selection on the display of an item of said local transaction message corresponding to an item of said standard transaction message, said mapping processing unit makes a check to see if there is any element which has not yet been input, and if any, instructs the user to perform the input operation.

8. An electronic transaction apparatus according to claim 2, wherein in case a reselection has been made of items through a designation of a range of a plurality of items of said standard transaction message after the creation said conversion table, said mapping processing unit displays a plurality of link lines between said items of said standard transaction message and items of said local transaction message corresponding thereto on the basis of link information of said items contained within said range designated in said conversion table.

9. An electronic transaction apparatus according to claim 8, wherein upon a contraction display of an item structure of said standard transaction message and an item structure of said local transaction message, said mapping processing unit groups by a plurality of items and merges for display said relevance information and link lines on group-to-group basis.

10. An electronic transaction apparatus according to claim 2, wherein upon a display of an item structure of said standard transaction message and an item structure of said local transaction message, said mapping processing unit displays items of each message at a reduced scale so as to allow the user to verify related items over the entirety of said messages.

11. An electronic transaction apparatus according to claim 10, wherein upon a selection of grouped message items, said mapping processing unit performs a detailed display of a plurality of items constituting said selected group.

12. An electronic transaction apparatus according to claim 1, further comprising:
 a system variable table in which are registered relations between items constituting said standard transaction message and system variables to which predetermined system values are assigned; and
 a system variable setting unit which upon a link of items of said standard transaction message registered into said system variable table by said mapping processing unit with items of said local message, assigns system variables registered in said system variable table to said items of said standard transaction message to register them into said conversion table, wherein when a format conversion is carried out by said conversion unit, corresponding system values are assigned to said system variables for the delivery to the conversion object.

13. A computer readable storage medium in which is recorded a control program for executing a format conversion on an electronic transaction, comprising:

a relevance information setting module for imparting the same relevance information to a plurality of related elements in a standard message to indicate a relevance,
 a mapping module which displays side by side on the same display said standard transaction message having said relevance information imparted thereto and said electronic local messages generated by a user application in accordance with a user proper local format, and while referring to said relevance information imparted to said related items in said standard transaction message, defines on the screen link relations with items of said local transaction message to create a conversion table, and
 a conversion module for performing a format conversion in accordance with said conversion table between said local transaction message provided by said user application and said standard message in conformity with t he standard format transmitted and received through a network.

14. A storage medium according to claim 13, wherein said mapping module displays side by side an item structure of said standard transaction message and an item structure of said local transaction message on the display, and upon the selection for linking of an item of said local transaction message corresponding to an item of said standard transaction message, displays a link line between the two items.

* * * * *